(12) United States Patent
Kim et al.

(10) Patent No.: US 12,182,992 B2
(45) Date of Patent: Dec. 31, 2024

(54) APPARATUS FOR INSPECTING APPEARANCE OF CAN FOR SECONDARY BATTERY

(71) Applicant: ENSCAPE CO., LTD., Seongnam-si (KR)

(72) Inventors: Nam Dong Kim, Suwon-si (KR); Sang Sik Min, Hwaseong-si (KR); Won Young Jeong, Suwon-si (KR); Jae Hyuk Choi, Gimpo-si (KR); Jin Hyeok Ko, Seoul (KR); Yong Deong Kang, Seongnam-si (KR); Sang Baek Kim, Seongnam-si (KR); Yoon Been Cho, Seoul (KR)

(73) Assignee: ENSCAPE CO., LTD., Seongnam-si (KR)

( * ) Notice: Subject to any disclaimer, the term of this patent is extended or adjusted under 35 U.S.C. 154(b) by 249 days.

(21) Appl. No.: 18/051,808

(22) Filed: Nov. 1, 2022

(65) Prior Publication Data
US 2023/0342910 A1    Oct. 26, 2023

(30) Foreign Application Priority Data

Apr. 25, 2022 (KR) .................. 10-2022-0050996
Jul. 26, 2022 (KR) .................. 10-2022-0092741
Jul. 28, 2022 (KR) .................. 10-2022-0094196

(51) Int. Cl.
*G06T 7/00* (2017.01)
*G01N 21/954* (2006.01)
(Continued)

(52) U.S. Cl.
CPC ........... *G06T 7/001* (2013.01); *G01N 21/954* (2013.01); *G06T 7/11* (2017.01); *H04N 23/56* (2023.01);
(Continued)

(58) Field of Classification Search
CPC ................. G06T 7/001; G06T 7/11; G06T 2207/20021; G06T 2207/30108;
(Continued)

(56) References Cited

U.S. PATENT DOCUMENTS

| | | | |
|---|---|---|---|
| 9,476,900 B2 * | 10/2016 | Akada | G01F 1/00 |
| 10,396,591 B2 * | 8/2019 | Zhao | H02J 9/061 |
| 10,929,732 B2 * | 2/2021 | Michiwaki | G01S 13/758 |
| 11,373,890 B2 * | 6/2022 | Gopalan | H01J 37/32715 |
| 2013/0080099 A1 * | 3/2013 | Akada | H02J 50/12 |
| | | | 307/104 |

(Continued)

FOREIGN PATENT DOCUMENTS

| CN | 105526962 A | 4/2016 |
|---|---|---|
| CN | 214584986 U | 11/2021 |

(Continued)

OTHER PUBLICATIONS

The Extended European Search Report for European Patent Application No. 22205019.7, dated Oct. 4, 2023.

*Primary Examiner* — Frank F Huang

(57) ABSTRACT

Disclosed is an apparatus for inspecting the appearance of a can for a secondary battery, which can obtain an image of the appearance of the can for the secondary battery and determine whether there is a defect. The apparatus for inspecting the appearance of a can for a secondary battery according to the disclosure obtains lateral images of a plurality of cans at once, and generates the lateral image for one can by extracting an area where each can is captured, thereby speeding up the inspection. Further, the lateral images of the can are obtained with light emitted in various combinations, thereby having an effect on improving the accuracy in defect diagnosis.

19 Claims, 35 Drawing Sheets

(51) Int. Cl.
    *G06T 7/11*      (2017.01)
    *H04N 23/56*     (2023.01)
    *H04N 23/698*    (2023.01)
    *H04N 23/74*     (2023.01)
    *H04N 23/90*     (2023.01)

(52) U.S. Cl.
    CPC ........... *H04N 23/698* (2023.01); *H04N 23/74* (2023.01); *H04N 23/90* (2023.01); *G06T 2207/20021* (2013.01); *G06T 2207/30108* (2013.01)

(58) Field of Classification Search
    CPC .... G01N 21/954; G01N 21/952; H04N 23/56; H04N 23/698; H04N 23/74; H04N 23/90
    See application file for complete search history.

(56) References Cited

U.S. PATENT DOCUMENTS

| | | | |
|---|---|---|---|
| 2022/0245784 A1* | 8/2022 | Kim | ........................ H04N 23/56 |
| 2023/0342904 A1* | 10/2023 | Kim | .................. H01M 10/4285 |
| 2023/0342910 A1* | 10/2023 | Kim | ..................... H04N 23/698 |
| 2023/0345106 A1* | 10/2023 | Kim | ........................ H04N 23/56 |

FOREIGN PATENT DOCUMENTS

| | | |
|---|---|---|
| JP | 4760188 B2 | 8/2011 |
| KR | 10-2011-0018080 A | 2/2011 |
| KR | 10-1030449 B1 | 4/2011 |
| KR | 10-1950447 B1 | 2/2019 |
| KR | 10-2386324 B1 | 4/2022 |

\* cited by examiner

APPARATUS FOR INSPECTING APPEARANCE OF CAN FOR SECONDARY BATTERY

CROSS REFERENCE TO RELATED APPLICATION

This application claims the benefit of Korean Patent Applications No. 10-2022-0050996 filed on Apr. 25, 2022, No. 10-2022-0092741 filed on Jul. 26, 2022, and No. 10-2022-0094196 filed on Jul. 28, 2022 in the Korean Intellectual Property Office, the disclosure of which is incorporated by reference herein in its entirety.

BACKGROUND OF THE INVENTION

Field of the Invention

The disclosure relates to an apparatus for inspecting a cab used in manufacturing a secondary battery.

Description of the Related Art

A secondary battery refers to a battery that supplies electric power to the outside by converting chemical energy into electrical energy, and receives and stores external power from the outside, when discharged, by converting electrical energy into chemical energy. With development of electronic devices, the secondary battery is being applied to various apparatuses in various fields.

Such a secondary battery is produced in various shapes. As one of various shapes, a cylindrical shape is applied to the secondary battery like a cylindrical battery that has been generally used and is still widely used.

A cylindrical secondary battery has a curved lateral surface, and therefore a method of inspecting the outer appearance of the cylindrical secondary battery while rotating the cylindrical secondary battery 360 degrees is generally used.

An appearance inspection apparatus for the cylindrical secondary battery has been disclosed in Korean Patent No. 1030449 (published on Apr. 25, 2011).

However, such a conventional inspection method has a problem in that a defective rate increases after final battery production because the accuracy of vision inspection for a can is low.

SUMMARY OF THE INVENTION

An aspect of the disclosure is to provide an apparatus for inspecting an appearance of a can for a secondary battery so as to solve a problem of a low inspection efficiency in a conventional inspection apparatus for a can used in a cylindrical secondary battery.

In accordance with an embodiment of the disclosure, there is provided an apparatus for inspecting an appearance of a can for a secondary battery, in which a plurality of cans are arranged side by side in a widthwise direction and rotated at the same time to obtain images according to angles.

In this case, a first inspection module may be used to obtain the images of the cans for the secondary battery with combination light at various positions according to the rotated angles of the cans.

Further, a pinhole inspection module may be used to obtain an image of the inside of the can for the secondary battery, and a second inspection module may be used to obtain an image of a lower surface of the can.

Further, a third inspection module employing a mirror may be used to obtain an image of the inside of the can.

DETAILED DESCRIPTION OF THE INVENTION

Figure 1:
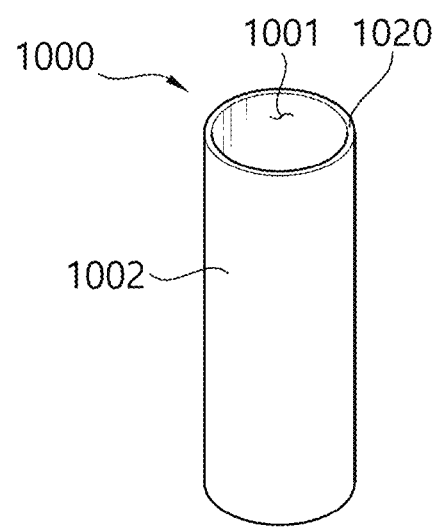
FIGS. 1 and 2 are views showing a can for a secondary battery.

Hereinafter, an apparatus for inspecting an appearance of a can for a secondary battery according to embodiments of the disclosure will be described in detail with reference to the accompanying drawings. The names of elements used in the following description may be referred to as other names in the art. However, these elements may be considered as equivalent elements in alternative embodiments as long as they have functional similarity and identity. Further, the reference numerals of the elements are provided for the convenience of description. However, the elements indicated by the reference numerals in the drawings are not limited to the scope shown in the drawings. Similarly, even though some elements in the drawings are modified in alternative embodiments, these elements are considered as equivalent elements as long as they have functional similarity and identity. Further, when elements are regarded as elements that should be naturally included at the level of those skilled in the art, descriptions thereof will be omitted.

In the following, descriptions will be made on the premise that a lengthwise direction of a can for a secondary battery refers to a height direction in a cylindrical structure, and a widthwise direction refers to a radial direction in the cylindrical structure. Further, descriptions will be made on the premise that a direction in which the can is opened refers to an upward direction.

Figure 2:
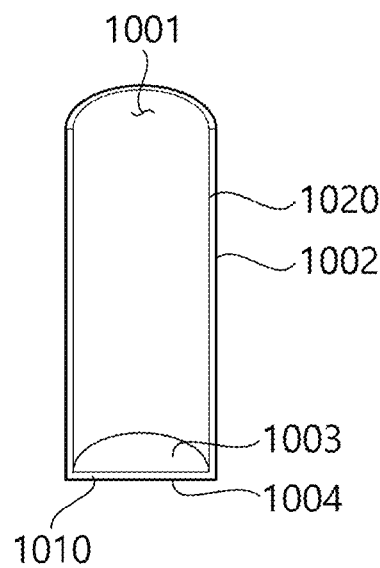

FIGS. 1 and 2 are views showing a can for a secondary battery.

According to the disclosure, a can for a secondary battery, which will be subjected to appearance inspection, is used to form a part of the outside of the secondary battery. The can for the secondary battery is made of a conductive material, and configured to serve as any one of poles when the secondary battery is completely manufactured. For example, the can may be configured to function as a negative hole.

Referring to FIG. 1, the can 1000 for the secondary battery is internally provided with an accommodating space, formed with an opening at an upper side, and includes a lower wall and a lateral wall 1020 which are formed as a single body. Referring to FIG. 2, the lateral wall 1020 and the lower wall 1010 may be formed having a constant thickness. The can 1000 for the secondary battery may undergo appearance inspection on an externally checkable surface thereof. For example, the inside of the can 1000, i.e., an inner surface 1001 of the lateral wall 1020 and an upper surface 1003 of the lower wall 1010 may be subjected to the inspection. Further, the outside of the can 1000, i.e., an outer surface 1002 of the lateral wall 1020 and a lower surface 1004 of the lower wall 1010 may be subjected to the inspection. According to the disclosure, in order to speed up the inspection, the inside of the can 1000, i.e., the inner surface 1001 of the lateral wall 1020 and the upper surface 1003 of the lower wall 1010 may be subjected to the inspection at the same time, and the outside of the can 1000, i.e., the outer surface 1002 of the lateral wall 1020 and the lower surface 1004 of the lower wall 1010 may be subjected to the inspection at the same time.

For convenience of description, the outer surface 1002 of the lateral wall 1020 will be referred to as a lateral surface.

Figure 3:
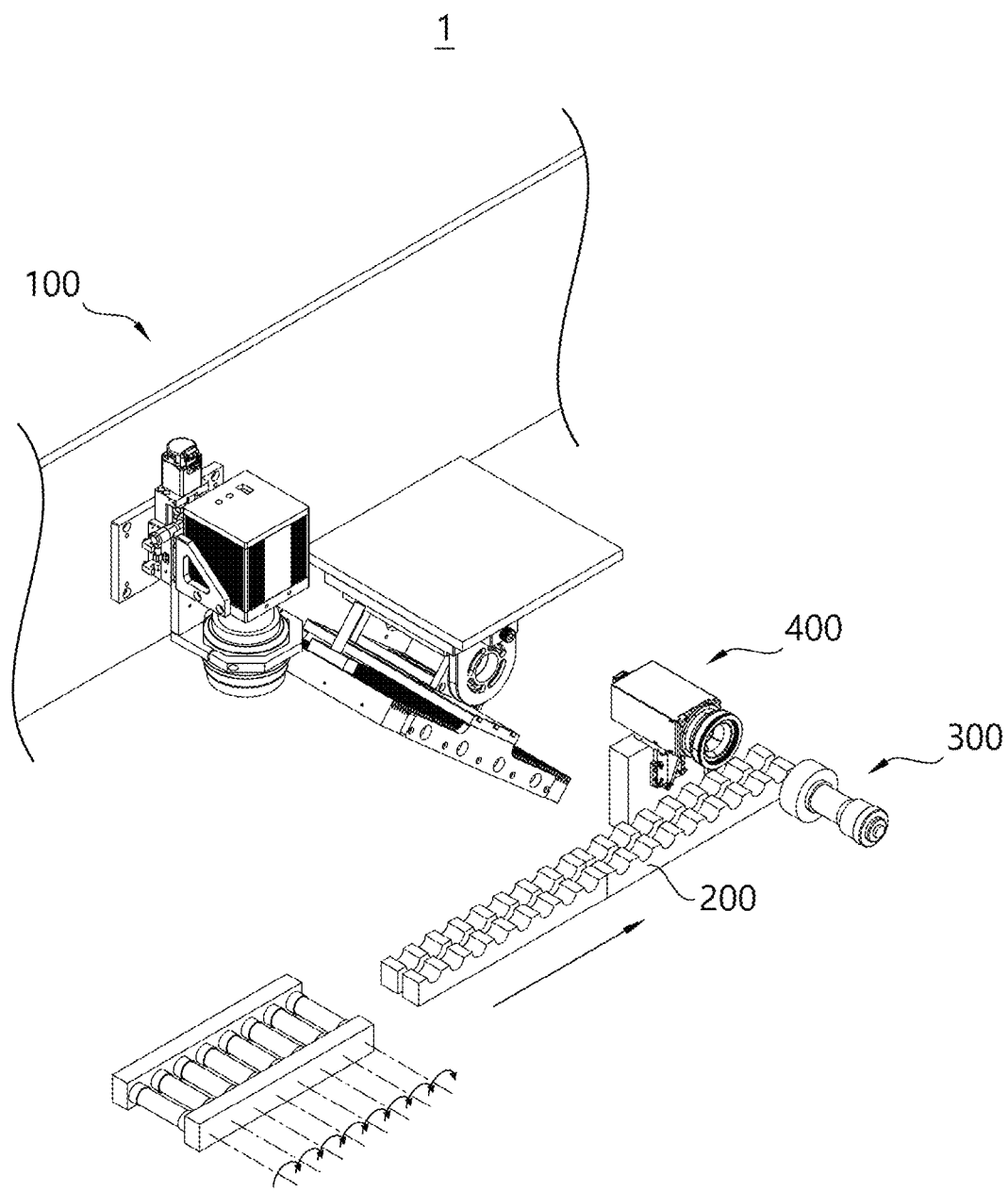
FIG. 3 is a perspective view of an apparatus for inspecting an appearance of a can for a secondary battery according to an embodiment of the disclosure.

FIG. 3 is a perspective view of an apparatus for inspecting an appearance of a can for a secondary battery according to an embodiment of the disclosure.

Referring to FIG. 3, according to an embodiment of the disclosure an apparatus 1 for inspecting an appearance of a can for a secondary battery may include a first inspection module 100, a second inspection module 400, a third inspection module, a transport 200, a controller (not shown), and an image processor (not shown).

The first inspection module 100 is configured to rotate a plurality of cans 1000 at the same time by 360 degrees or more with respect to a lengthwise central axis in a state that the cans 1000 are arranged side by side in their thickness direction, and obtain lateral images of the plurality of cans 1000.

The first inspection module 100 may obtain the lateral images of the plurality of cans 1000 at predetermined angles, for example, at 120 degrees, 240 degrees, and 0 degrees while rotating the can 1000 at intervals of 120 degrees. In this case, the first inspection module 100 may obtain a plurality of images at one angle with different lighting combinations, i.e., different positions and numbers of light emitting units which are emitting light in the first lighting unit. Such an operation of obtaining the images is repeatedly performed while simultaneously rotating the plurality of cans at a predetermined angle. Meanwhile, the structure and function of the lateral inspection module 100 will be described in detail later.

The third inspection module is configured to obtain an image of the inside of the can 1000. When the appearance inspection for the lower surface and the inner surface is performed without changing the position of the can, the third inspection module is disposed to face in a direction opposite to a direction in which the camera of the second inspection module 400 faces. The third inspection module may include a pinhole inspection module 300. The pinhole inspection module 300 may include a pinhole camera disposed in a direction to face the inner surface of the transported can from above. The pinhole camera has a smaller aperture than a general camera and thus has a wide view angle. Therefore, when the can is viewed from above, the pinhole camera can take an image of both the upper surface of the lower wall and the inner surface of the lateral wall at the same time.

The second inspection module 400 is configured to capture the lower surface of the can 1000. The second inspection module 400 may include a second lighting unit and a camera module, and may be configured to emit light toward the lower surface of the transported can and take an image of the lower surface of the transported can.

The transport 200 is configured to transport the can for the secondary battery. The transport 200 is configured to transport the plurality of cans 1000 from the first inspection module 100, the second inspection module 400, and the pinhole inspection module 300 to an inspection position for inspecting the cans 1000.

FIG. 3 illustrates that the transport 200 is configured to transport the cans 1000, which have been subjected to the lateral appearance inspection by the first inspection module 100, to the inspection positions of the second inspection module 400 and the pinhole inspection module 300. However, the foregoing positions of the second inspection module 400 and the pinhole inspection module 300 are merely an example, and may be changed to inspect the cans arranged at different portions.

Meanwhile, the transport 200 may transport the cans 100 arranged side by side in the widthwise direction so as to minimize change in posture for the appearance inspection.

The transport 200 may control the transport speed of the can to be different according to a plurality of divisional sections. For example, in the first inspection module 100, in which several cans are inspected at a time, the transport of the can is stopped until the lateral inspection for a plurality of cans is completed. Then, the plurality of cans is removed from the position of the lateral inspection module at a time. In other words, the transport 200 controls the cans to move a distance as much as the number of cans to be subjected to the lateral inspection at once in a certain section. Further, the transport 200 transports the cans by repeating the process of transporting the cans, which is passing through the second inspection module 400 and the pinhole inspection module 300, by a predetermined distance. In other words, the transport 200 may operate in synchronization with the functions of the lower inspection module and the pinhole inspection module which repeatedly capture the cans one by one. Meanwhile, the transport 200 may include a recessed supporter at an upper side thereof to seat each can thereon, and may also include various publicly known configurations for smoothing the transport of the can, such as a separate Pick up and place module (not shown) for transporting the can from the first inspection module 100 to the transport.

The transport 200 may receive a plurality of, for example, eight cans at a time after the lateral inspection for the plurality of cans is completed by the first inspection module 100. Then, the transport 200 moves the cans to a space between the second inspection module 400 and the pinhole inspection module 300 in the widthwise direction by a predetermined distance. In other words, the transport 200 may transport the can by a distance between the lengthwise central axes of two adjacent cans. Therefore, without separately adjusting the positions of the second inspection module 400 and the pinhole inspection module 300, the cans may be transported one by one to the inspection position by one transport operation of the transport 200. The transport 200 may include an actuator for the transport, and a seat for the can. The seat for the can may support the can in the widthwise direction between the lengthwise opposite ends of the can so as to prevent interference when images are captured from above and below. Meanwhile, various configurations are possible for such transport, and thus more detailed descriptions thereof will be omitted.

The controller (not shown) is configured to control each of the inspection module and the transport 200. The controller may be provided at one side of the apparatus for inspecting the appearance of a can for a secondary battery, and may include a well-known processor. The controller may control the transport to transport each can to an correct inspection position, and may control the inspection module to obtain images.

The image processor (not shown) is configured to process a plurality of images obtained from the inspection modules. The image processor may analyze the plurality of images to determine whether there is a defect, so that the controller can determine a transport path for an individual can based on whether there is the defect. Further, the image processor is configured to transmit information about whether a defect is present in each can to a central controller.

In particular, the image processor may generate an image for an individual can based on the image obtained from the first inspection module (to be described later). In this regard, detailed descriptions will be made later with reference to FIGS. 11 to 15.

Below, the lateral inspection for the can will be described in detail with reference to FIGS. 4 and 15.

Figure 4:
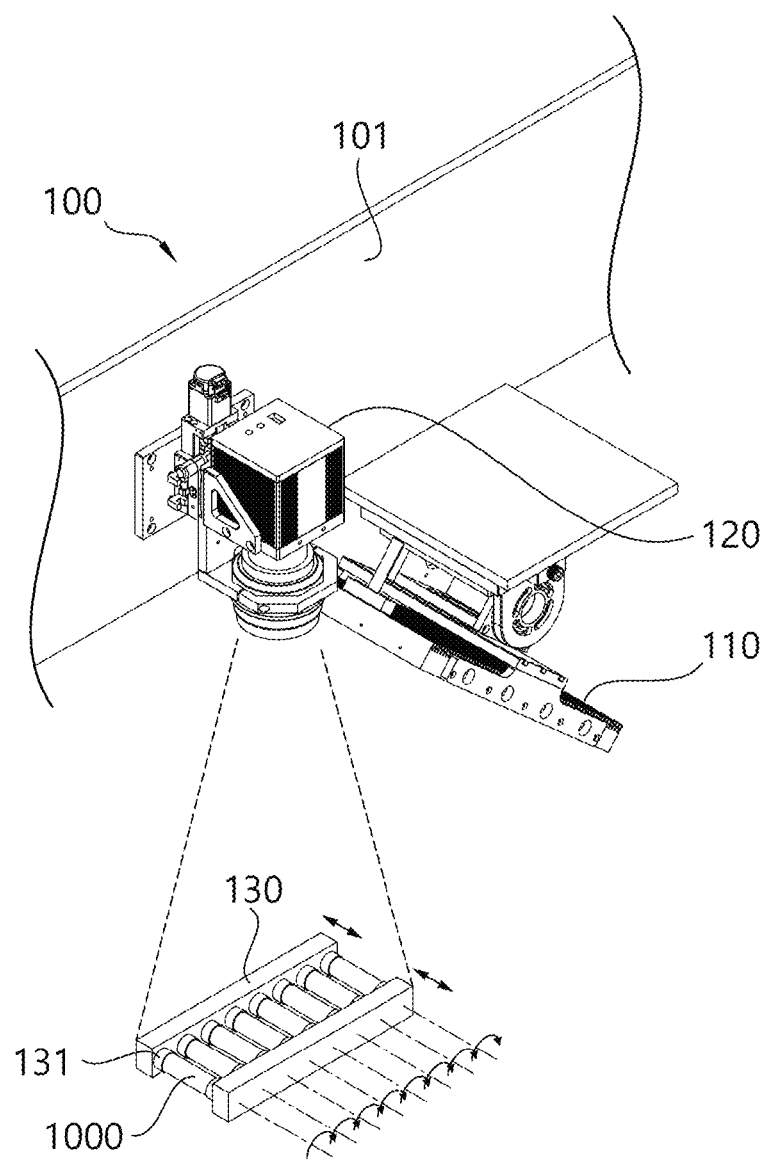
FIG. 4 is a perspective view of a first inspection module.

FIG. 4 is a perspective view of a first inspection module.

Referring to FIG. 4, the first inspection module 100 according to an embodiment of the disclosure may include a hand 130, a first lighting unit 110, and a first camera 120. Here, the first lighting unit 110 and the first camera 120 may be provided on a vertical frame. In other words, the first lighting unit 110 and the first camera 120 are configured to emit light and take an image while looking down the plurality of cans 1000 for the secondary batteries, arranged side by side in a horizontal direction, from above.

The hand 130 may be configured to rotate the plurality of cans 1000 for the secondary batteries at the same time. The hand 130 is configured to rotate the cans 1000 while supporting the opposite sides of the transport, i.e., the lengthwise opposite sides of the cans loaded in the transport. The hands 130 may be configured to form a pair at the opposite sides of the transport and configured to be actuated in synchronized with each other. One pair of hands 130 includes grippers to be in contact with the can, and a space between the grippers 131 forming one pair may be configured to be adjustable. In other words, one pair of hands 130 may become away from each other to prevent interference with the can being transported to the lateral inspection position or being taken out after the lateral inspection is completed. On the other hand, in order to rotate the can 1000 during the inspection, one pair of hands 130 may be configured to become narrower and press the can 1000 in the lengthwise direction, thereby temporarily holding and rotating the can 1000. However, this configuration may be may be modified variously as long as it can minimize the interference with the plurality of cans 1000 when obtaining the lateral image and at the same time rotate the plurality of cans 1000.

The first lighting unit 110 may be configured to emit light to the plurality of cans 1000 picked up simultaneously. The first lighting unit 110 may include a plurality of light emitting units 112. Each light emitting unit 112 may be formed as extended in a horizontal direction. In other words, the light emitting area of the first lighting unit 110 may be formed in a direction perpendicular to the lengthwise direction of the picked-up can 1000. Further, the plurality of light emitting units 112 may be vertically arranged side by side and configured to operate independently of each other.

The first lighting unit 110 may be configured to emit light appropriately while avoiding interference with the first camera 120, and may be disposed to emit light obliquely with respect to an arrangement direction where the cans 1000 are picked up and arranged. For example, the first lighting unit 110 may be spaced apart at a predetermined distance from the inspection position, and disposed at an angle of 45 degrees to a central portion in the row of the cans 1000 for the secondary batteries arranged at the inspection position. However, such an angle is merely an example, and the first lighting unit 110 may be disposed at various angles.

The first camera 120 may have an appropriate view angle, and may be disposed at a predetermined distance from the inspection position where the cans are picked up by the hand 130 and arranged. The first camera 120 is provided as an area camera and configured to obtain a captured image for the inspection position including an image for about half of each can at a time of capturing. The first camera 120 may have an optical axis set perpendicularly to the arrangement direction where the cans 1000 are arranged at the inspection position. In other words, the first camera 120 may be disposed with its optical axis passing through the central position of the arrangement when the plurality of cans are arranged.

Meanwhile, the controller (not shown) may be configured to control the first camera 120, the hand 130, and the first lighting unit 110. The controller may be configured to control the position of the hand 130, and control the rotation of the gripper module 131. The controller may control the rotation of the gripper module 131, the operation of the first camera 120, and the operation of the first lighting unit 110 in connection with one another. The controller controls the gripper module 131 to rotate at the start of the inspection, and controls the operations of the first lighting unit 110 and the first camera 120 to be synchronized so that the first camera 120 can operate to obtain a captured image when the first lighting unit 110 operates to emit light to the inspection position. Further, the controller may control the first lighting unit 110 to emit light through the plurality of light emitting modules patterned in a predetermined order in the first lighting unit 110.

Figure 5:
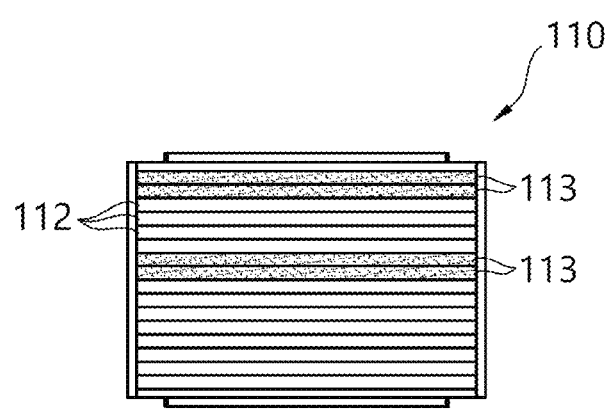
FIGS. 5, 6 and 7 are operational state views of a first lighting unit.
Figure 6:
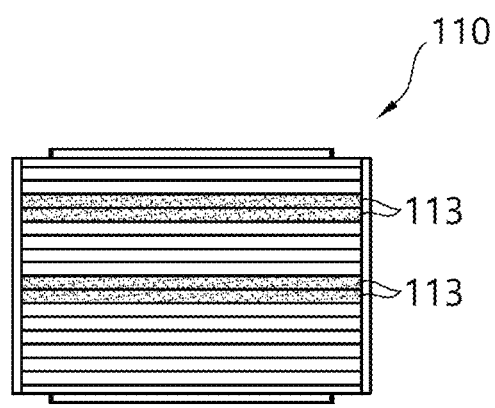
Figure 7:
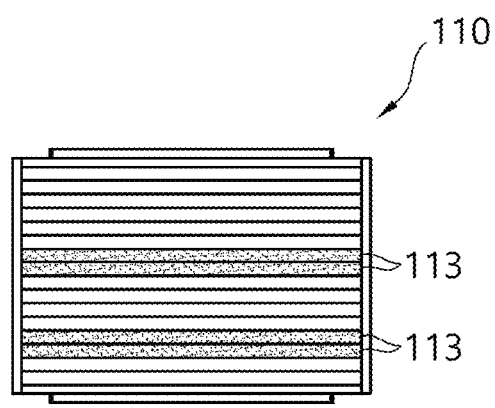

FIGS. 5, 6 and 7 are operational state views of a first lighting unit.

Referring to FIGS. 5, 6 and 7, as described above, the first lighting unit 110 includes a plurality of light emitting module, and the light emitting modules may be vertically arranged side by side in parallel with each other. The first lighting unit 110 may emit light by patterning a light emitting area 113 under control of the controller. For example, referring to FIG. 5, a first pattern may be formed to generate two straight light emitting areas 113 by simultaneously operating the uppermost light emitting module and a light emitting module spaced apart at a predetermined distance downward from the uppermost light emitting module. Further, referring to FIG. 6, a second pattern may be formed to generate light emitting areas 113 by emitting light in a pair of two straight lines parallel with each other in a horizontal direction, and shifting the position of a selected light emitting module to a lower side than that of the first pattern. Further, referring to FIG. 7, a third pattern may be formed to generate light emitting areas 113 by selecting the light emitting module at a position shifted to a lower side than that of the foregoing second pattern. In this way, the first lighting unit 110 emits light by shifting the light emitting positions in a vertical direction, and it is easier to detect a defect in an outer appearance because the light emitting positions are shifted in the lengthwise direction of the picked-up can 1000, i.e., in the vertical direction.

Below, a process of obtaining a lateral image of a can by the first inspection module will be described with reference to FIGS. 8 to 10.

Figure 8:
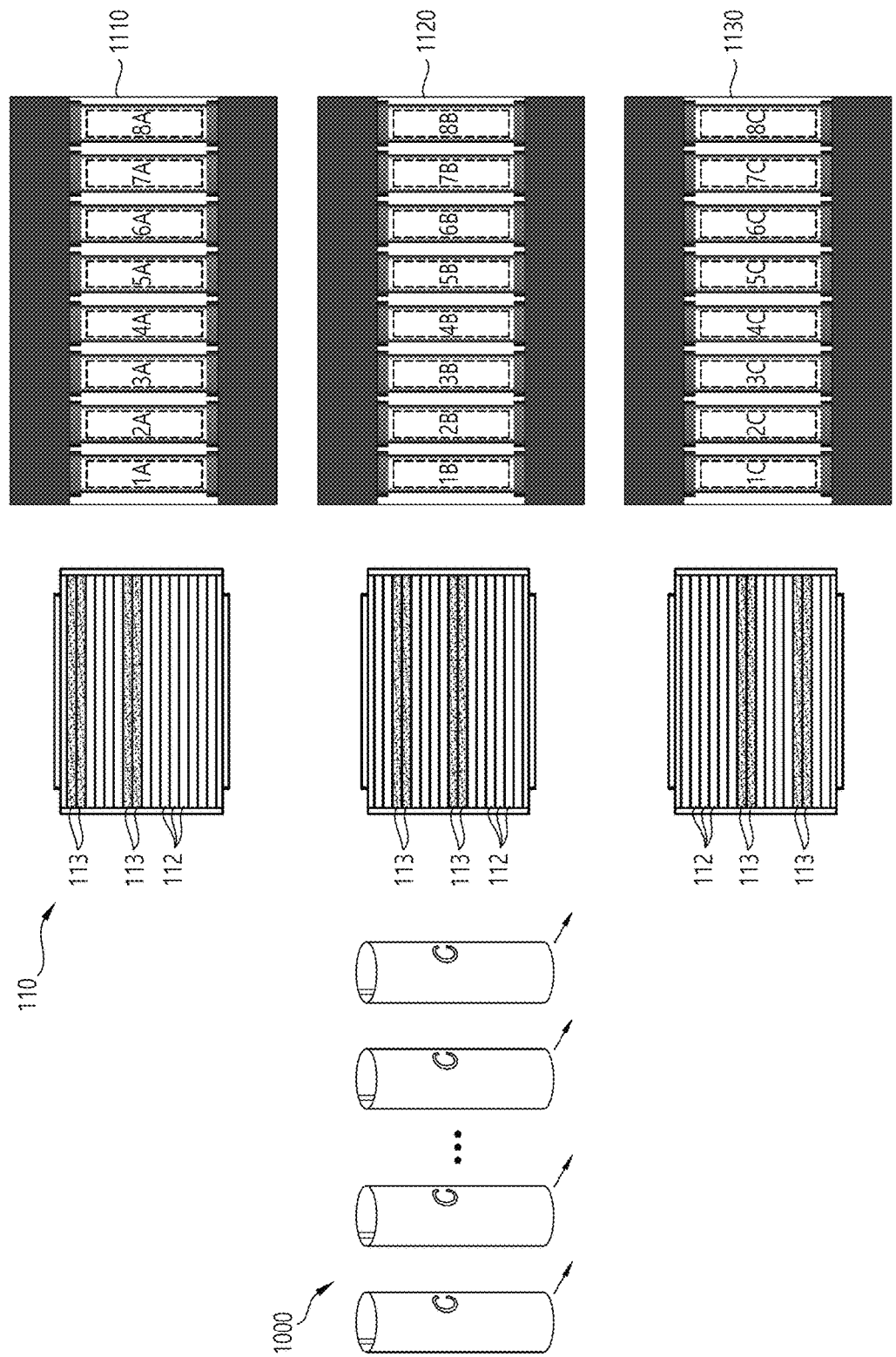
FIG. 8 is a view showing an operation of a first lighting unit and an obtained image when the cans are disposed at a first angle.

FIG. 8 is a view showing an operation of a first lighting unit and an obtained image when the cans are disposed at a first angle.

Referring to FIG. 8, a plurality of cans are arranged side by side at the first angle. In this case, descriptions will be made on the premise that the number of cans is eight. The cans may be temporarily held by the hand (not shown) and their angles may be adjusted at the same time. In this case, the first lighting unit 110 may emit light in a pattern based on different lighting combinations in the state that the cans are arranged at the first angle, thereby obtaining the images of the cans. Specifically, an image 1110 is obtained while the first lighting unit 110 emits light in a first lighting pattern, an image 1120 is obtained while light is emitted in a second lighting pattern, and an image 1130 may be obtained while light is emitted in a third lighting pattern.

Each image shows a first can 1A, a second can 2A, a third can 3A, a fourth can 4A, a fifth can 5A, a sixth can 6A, a seventh can 7A and an eighth can 8A, which are arranged sided by side, from the left in FIG. 8. In this case, the image includes an image of a lateral outer surface by about 180 degrees along a circumferential direction of the can for the secondary battery.

Figure 9:
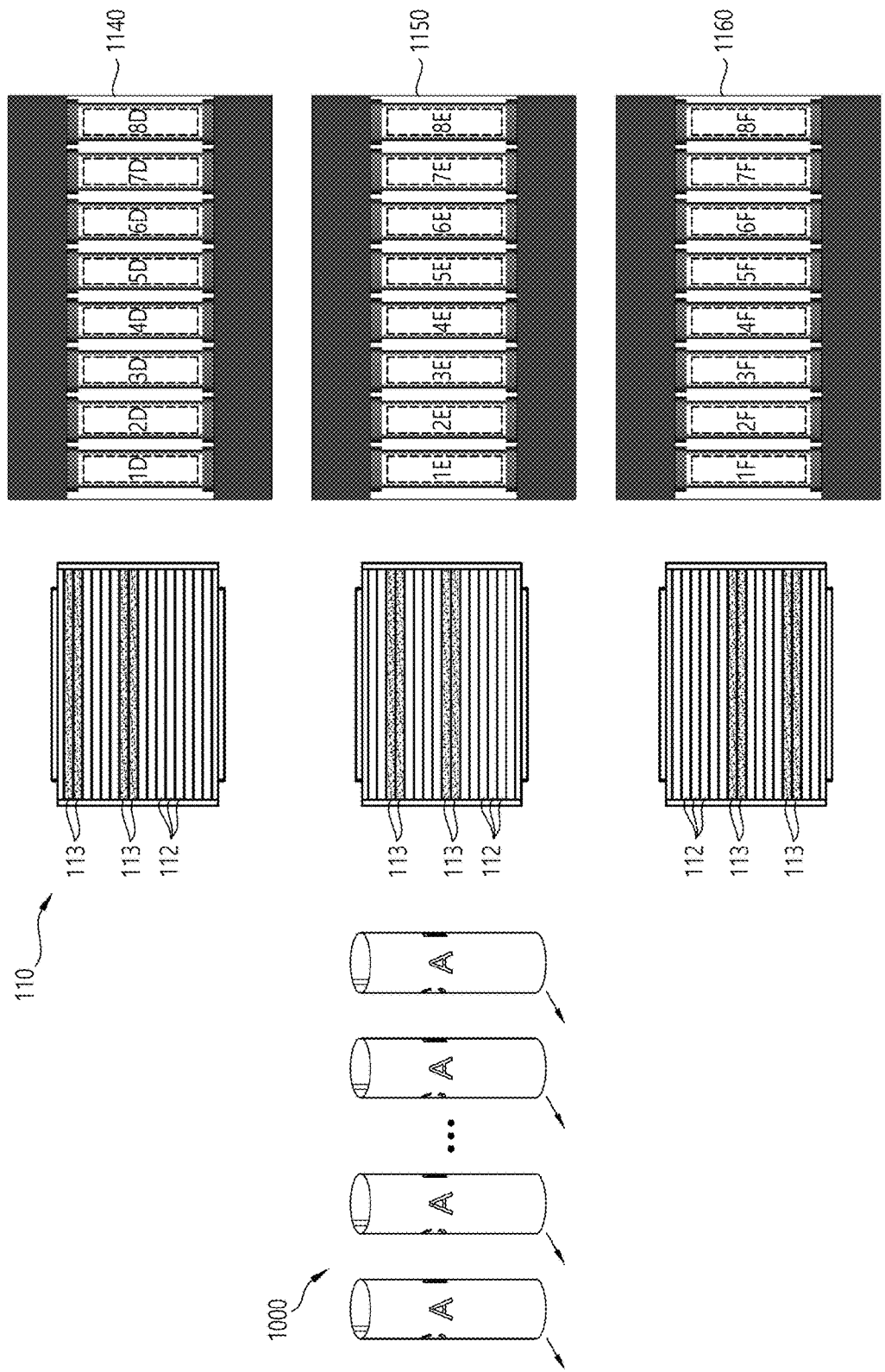
FIG. 9 is a view showing an operation of a first lighting unit and an obtained image when the cans are disposed at a second angle.

FIG. 9 is a view showing an operation of a first lighting unit and an obtained image when the cans are disposed at a second angle.

After obtaining the lateral images at the first angle of FIG. 8, the controller operates the grippers to rotate all the eight cans by the same angle so that the cans can be arranged at the second angle. For example, the second angle may differ from the first angle by 120 degrees. Then, like that of FIG. 8, the first camera obtains images 1140, 1150 and 1160 in synchronization with the first lighting unit 110 that emits light while shifting to the first lighting pattern, the second lighting pattern and the third lighting pattern.

Figure 10:
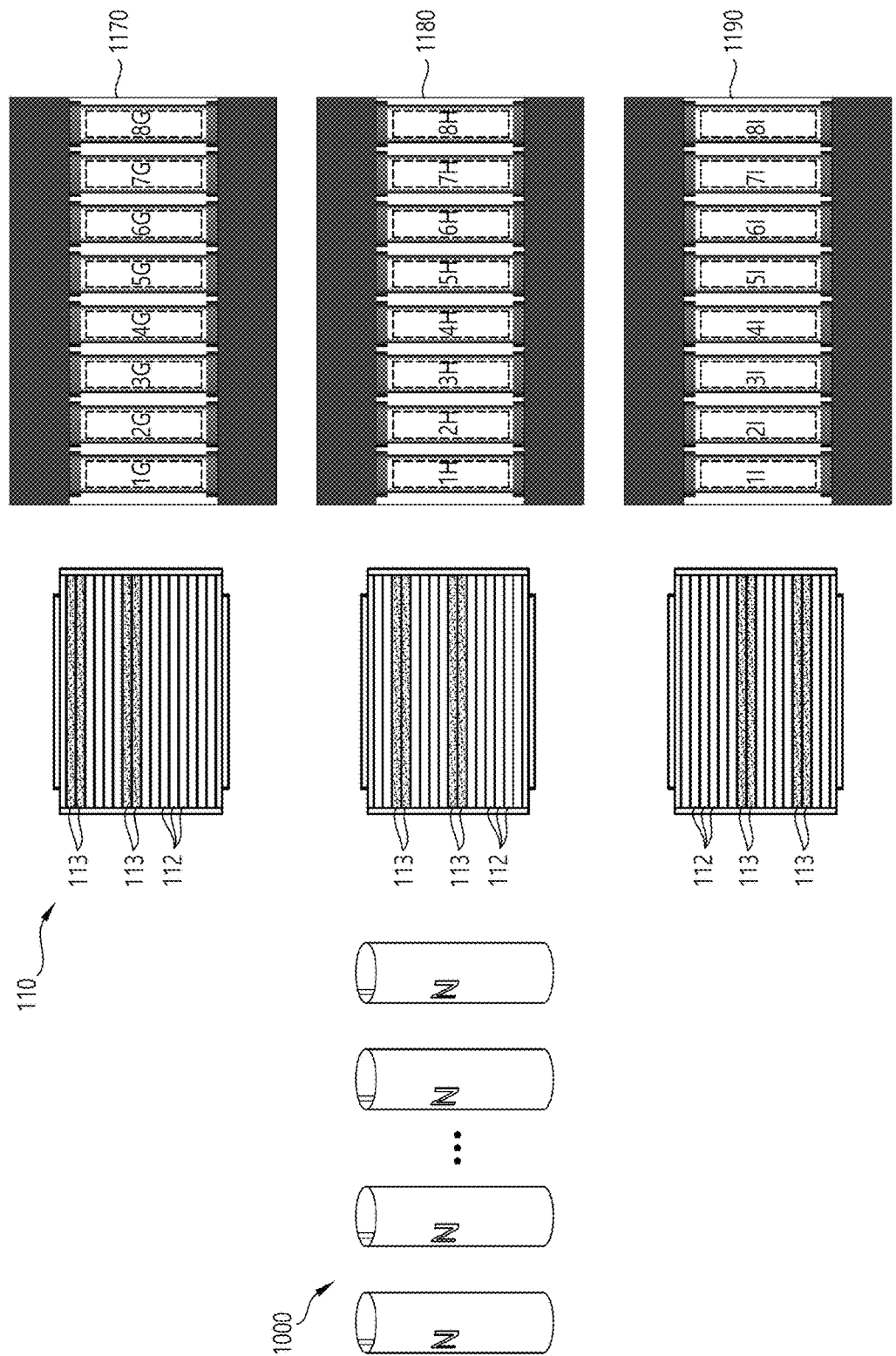
FIG. 10 is a view showing an operation of a first lighting unit and an obtained image when the cans are disposed at a third angle.

FIG. 10 is a view showing an operation of a first lighting unit and an obtained image when the cans are disposed at a third angle.

Referring to FIG. 10, after obtaining the lateral images at the second angle of FIG. 9, the controller operates the grippers to rotate all the eight cans by the same angle so that the cans can be arranged at the third angle. For example, the third angle may differ from the second angle by 120 degrees. Then, like that of FIG. 8, the first camera obtains images 1170, 1180 and 1190 in synchronization with the first lighting unit 110 that emits light while shifting to the first lighting pattern, the second lighting pattern and the third lighting pattern.

As described above with reference to FIGS. 8 to 10, the controller operates the gripper module 131 to rotate the plurality of picked-up cans by a predetermined angle so as to obtain images. For example, the predetermined angle may be 120 degrees. This is because it is difficult to obtain an accurate outer image of a cylinder due to the limit of a view angle when a cylindrical can is captured as a flat image. In other words, the captured image is an image of 180 degrees corresponding to about half of the can, but it is difficult to accurately determine a defect through the obtained image in an area where the direction of the tangent line on the outer surface of the cylindrical can is similar to the optical axis, i.e., toward the left and right ends when being captured. Therefore, parts corresponding to areas of 120 degrees are extracted from the captured images, and then reconstructed as the whole image of 360 degrees to determine a defect. However, such a rotation angle is merely an example. To increase the accuracy, the can may be rotated at intervals of 90 degrees, or more frequently, at intervals of 60, 45 or 30 degrees, and the capturing positions may be adjusted correspondingly to the rotation angles. Below, descriptions will be made on the assumption that the cans are rotated at intervals of 120 degrees and their lateral images are obtained three times.

Below, it will be described with reference to FIGS. 11 to 15 that the image processor generates a lateral inspection image for the can.

Figure 11:
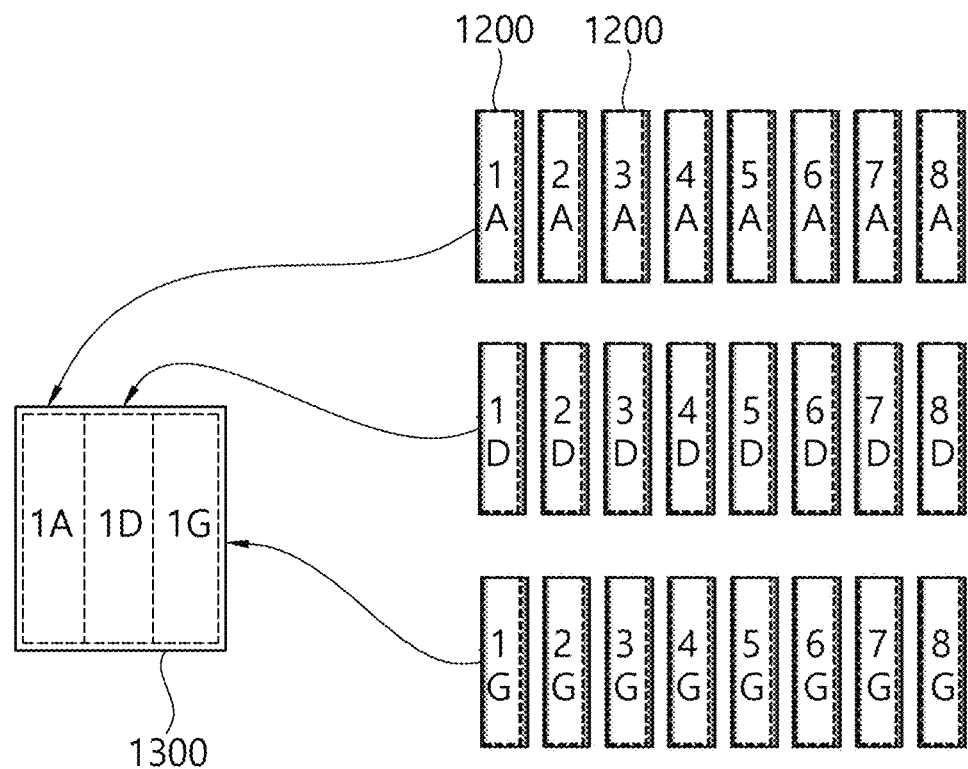
FIG. 11 is a view showing concept that an image processor combines lateral object images to generate a lateral inspection image.

FIG. 11 is a view showing concept that an image processor combines lateral object images to generate a lateral inspection image.

Referring to FIG. 11, the image processor may receive the captured image obtained by the first camera 120 and then generate a lateral inspection image. In each captured image, an image of partial lateral surfaces of a plurality of cans may be obtained. In this case, it is difficult to check predetermined areas adjacent to the boundaries of opposite sides on the captured image of each can, and thus an image for a predetermined area is extracted with respect to the axis of bilateral symmetry except the predetermined area adjacent to the boundaries. The image processor extracts an entity image area 1200, in which each can is captured, from one obtained image. The image processor extracts the entity image areas 1200 from all the obtained images 1110, 1120, 1130, 1140, 1150, 1160, 1170, 1180 and 1190. Therefore, the number of extracted entity image areas may be determined by multiplying the number of captured images and the number of picked-up cans.

The image processor may extract 72 entity image areas in the case of the foregoing example described with reference to FIGS. 8 to 10.

Figure 12:
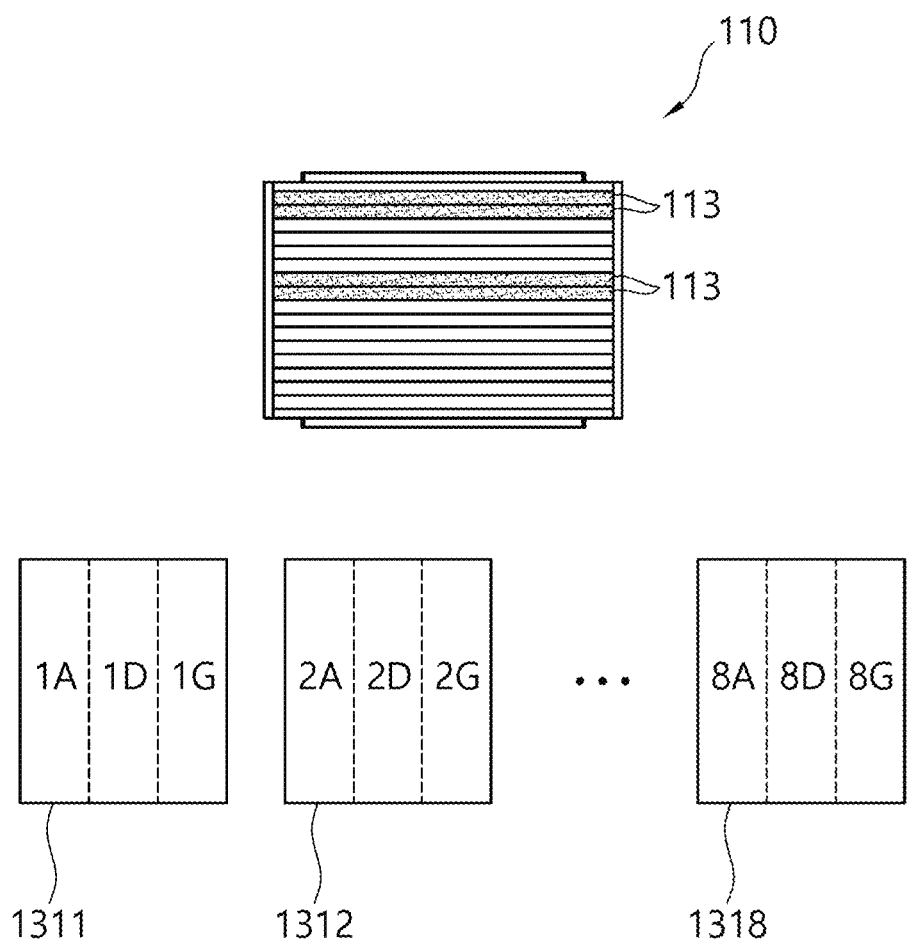
FIG. 12 is a view showing lateral inspection images of a plurality of cans, which are obtained when a first lighting unit emits light in a first pattern.

FIG. 12 is a view showing lateral inspection images of a plurality of cans, which are obtained when a first lighting unit emits light in a first pattern.

After extracting the entity image areas, the image processor combines and composites the extracted images according to the lighting patterns, according to the cans, and according to the rotation angles of the cans.

Referring to FIG. 12, the images of the first can captured in the first lighting pattern, which are the image LA at the rotation angle of 0 degrees, the image 1D at the rotation angle of 120 degrees and the image 1G at the rotation angle of 240 degrees, are combined in sequence to generate a lateral inspection image 1311 of a first can in the first pattern.

The foregoing process of generating the lateral inspection image is applied to the first to eighth cans, and thus eight lateral inspection images captured by selecting the light emitting area 113 in the first pattern are generated. For convenience of description, FIG. 12 shows a first can lateral inspection image 1311 in the first pattern, a second can lateral inspection image 1312 in the first pattern, and an eighth can lateral inspection image 1318 in the first pattern.

Figure 13:
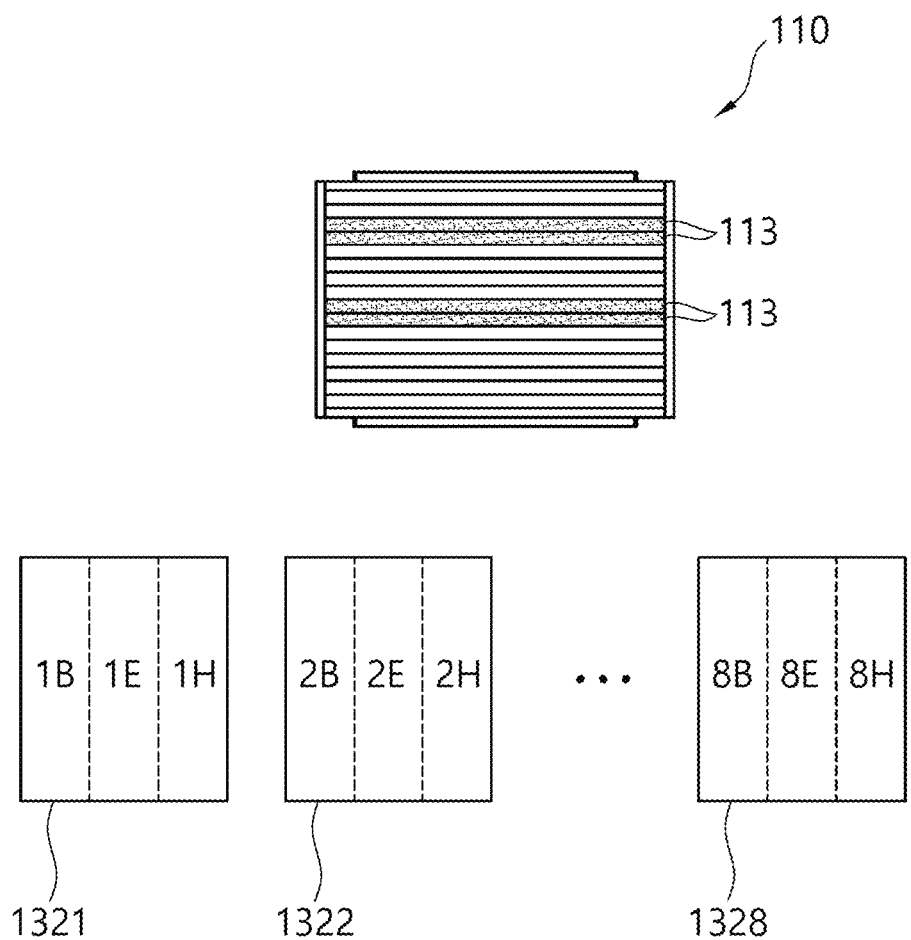
FIG. 13 is a view showing lateral inspection images of a plurality of cans, which are obtained when a first lighting unit emits light in a second pattern.

FIG. 13 is a view showing lateral inspection images of a plurality of cans, which are obtained when a first lighting unit emits light in a second pattern.

FIG. 13 shows the lateral inspection image of each can when the first lighting unit 110 emits light by selecting the light emitting area 113 in the second lighting pattern. For convenience of description, FIG. 13 shows a first can lateral inspection image 1321 in the second lighting pattern, a second can lateral inspection image 1322 in the second lighting pattern, and the eighth can lateral inspection image 1328 in the second pattern.

Figure 14:
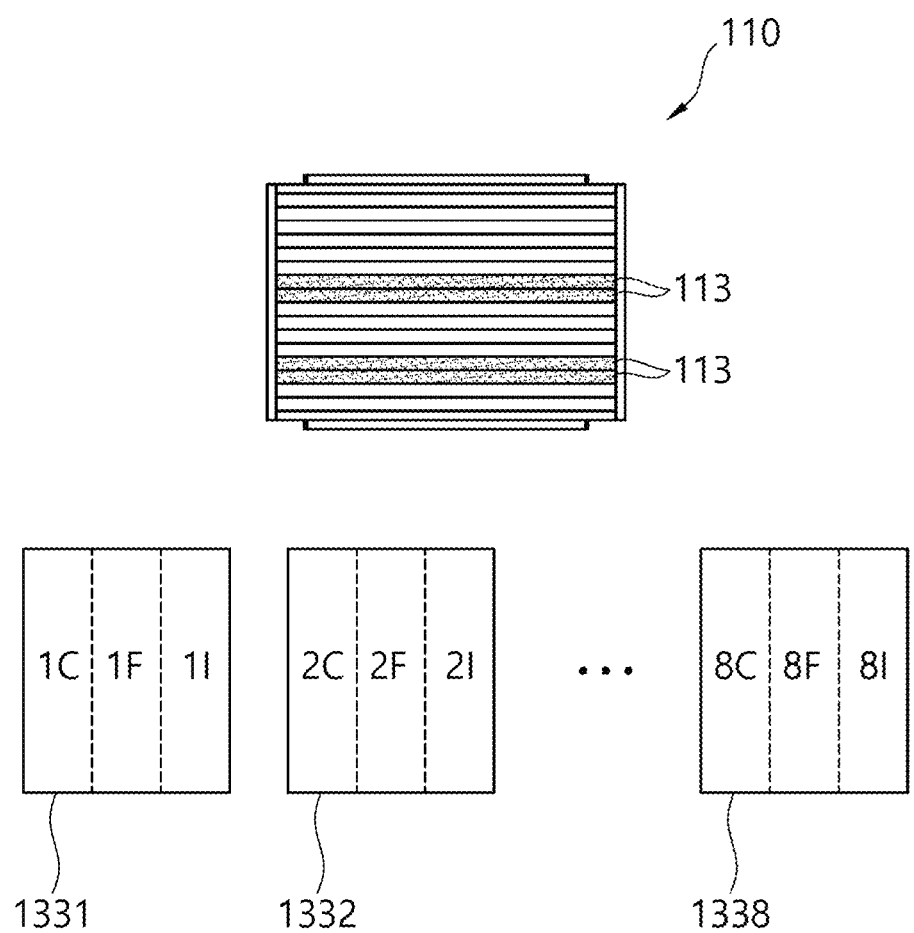
FIG. 14 is a view showing lateral inspection images of a plurality of cans, which are obtained when a first lighting unit emits light in a third pattern.

FIG. 14 is a view showing lateral inspection images of a plurality of cans, which are obtained when a first lighting unit emits light in a third pattern.

FIG. 14 shows the lateral inspection image of each can when the first lighting unit 110 emits light by selecting the light emitting area 113 in the third lighting pattern. For convenience of description, FIG. 14 shows a first can lateral inspection image 1331 in the third pattern, a second can lateral inspection image 1332 in the third pattern, and the eighth can lateral inspection image 1338 in the third pattern.

Figure 15:
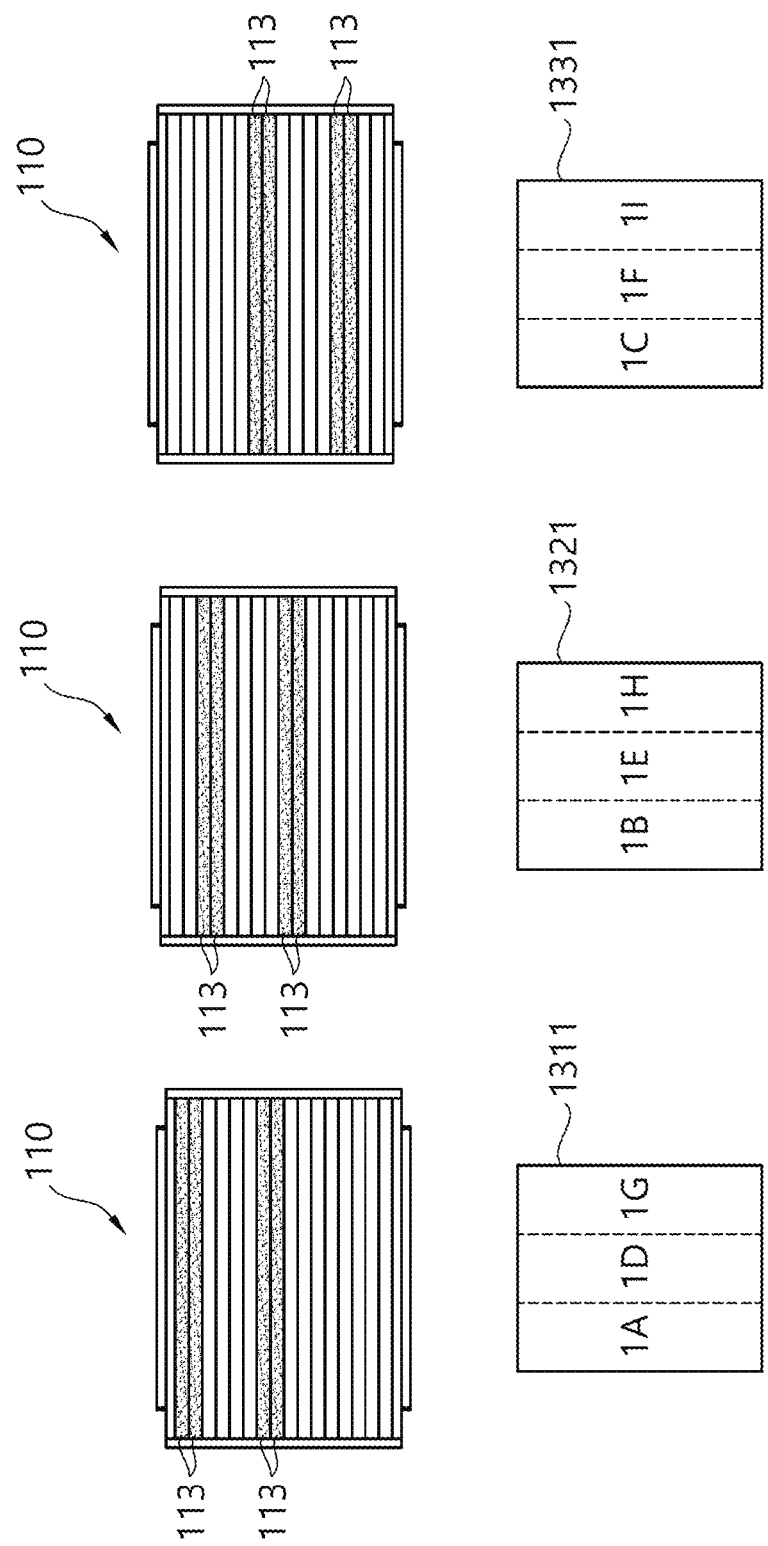
FIG. 15 is a view showing concept that a plurality of inspection images of one can for a secondary battery are obtained when one lateral inspection is completed.

FIG. 15 is a view showing concept that a plurality of inspection images of one can for a secondary battery are obtained when one lateral inspection is completed.

Referring to FIG. 15, three lateral inspection images are illustrated with respect to the first can.

For better understanding, both the patterns of the lighting unit 110 and the obtained lateral inspection images are shown at a time.

In FIG. 15, the inspection image 1311 of the first can with the first pattern is shown on the left, the inspection image 1321 of the first can with the second pattern is shown in the middle, and the inspection image 1331 of the first can with the third pattern is shown on the right. Eventually, the entity image areas of each can are extracted from the captured lateral images and combined to obtain a complete lateral inspection image of the entire lateral surface. Further, the inspection images are obtained with light emitted while shifting the lighting pattern.

With this, the image processor performs the lateral appearance inspection for each can and determines whether there is a defect. In other words, the image inspection shown in FIG. 15 may be performed with respect to all the first to eighth cans.

When the lateral inspection is performed for the plurality of cans, the plurality of cans are arranged and captured at the same time to obtain the lateral images thereof, thereby significantly speeding up the lateral appearance inspection.

Below, the second inspection module and the pinhole inspection module will be described in detail with reference to FIGS. 16 to 25.

Figure 16:
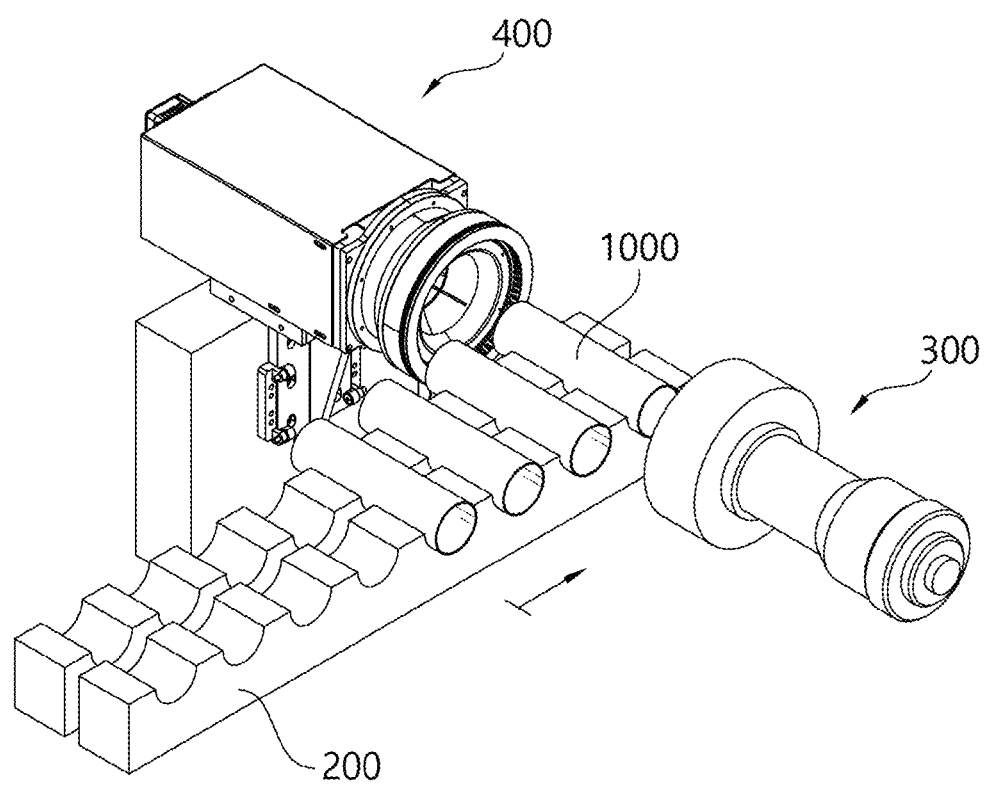
FIG. 16 is a perspective view centering on inspection positions of a second inspection module and a pinhole inspection module.

FIG. 16 is a perspective view centering on inspection positions of a second inspection module and a pinhole inspection module.

Referring to FIG. 16, the third inspection module and the second inspection module 400 according to the disclosure are configured to obtain images of the inner and lower surfaces of the can 1000 at the opposite sides of the transport 200.

The third inspection module may include the pinhole inspection module 300. The pinhole inspection module 300 may include the pinhole lighting unit and the pinhole camera, so that the pinhole lighting unit 301 can emit light to the inside of the can to, at the same time, obtain the internal image of the can.

Meanwhile, the second inspection module 400 may be movable in a horizontal direction as connected to an external frame. For example, the external frame includes a horizontal actuator (not shown) configured to adjust the position of the second inspection module. Therefore, the horizontal position of the lower inspection module is precisely adjusted together with the stepwise transport of the can in the transport 200, thereby helping to obtain an accurate image of the lower surface.

The pinhole inspection module 300 may be configured to move a predetermined distance in the same direction as the transport direction of the can like the second inspection module 400. Therefore, the image is obtained by precisely adjusting the horizontal position together with the movement of the can 1000 by the transport.

The controller may control the operations of the pinhole inspection module 300 and the transport 200 together. In other words, the cans are sequentially moved step by step to be disposed at the inspection position of the pinhole inspection module, and, at this time, the pinhole inspection module operates to obtain the images whenever the cans are transported to the inspection position. Further, the lower inspection module also obtains the lower surface images when the cans are newly transported to the inspection position.

Figure 17:
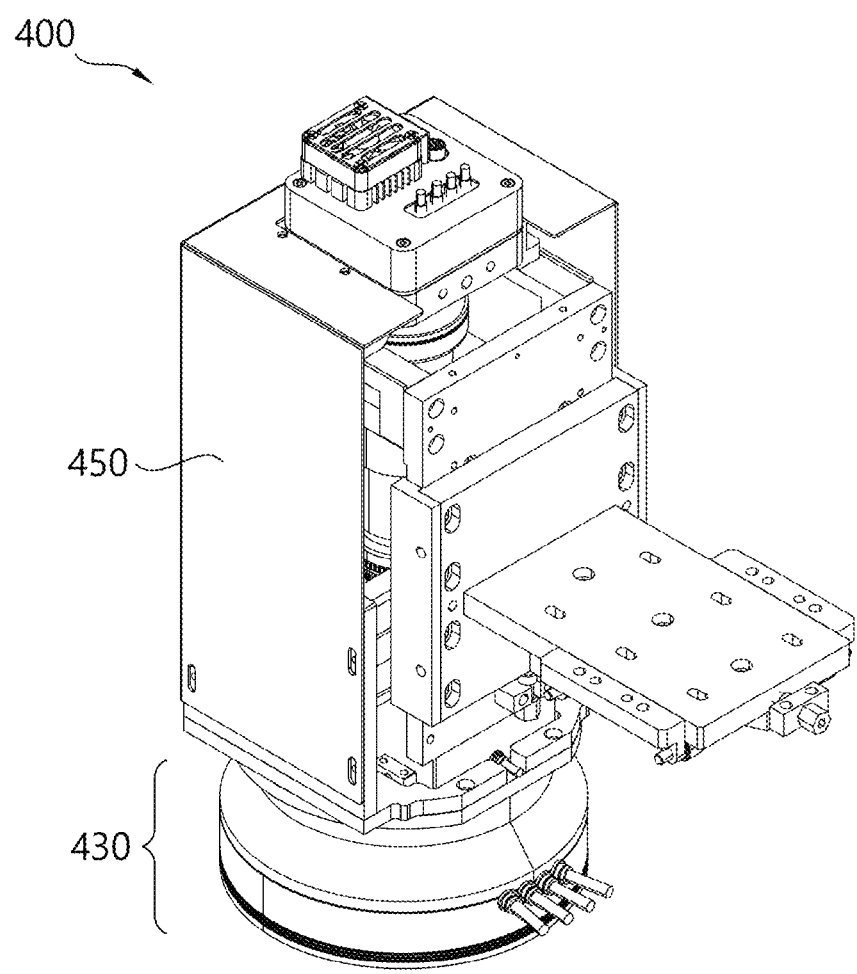
FIG. 17 is a perspective view of a second inspection module.

FIG. 17 is a perspective view of a second inspection module.

The second inspection module 400 may be provided in the lateral side of the transport to obtain images while facing the lower surfaces of the cans when the cans are arranged and loaded during the transport.

The second inspection module 400 may include a lower lighting unit 430 and the lower camera which are disposed frontward, i.e., toward the cans, and a casing 450 provided surrounding the lower camera.

Figure 18:
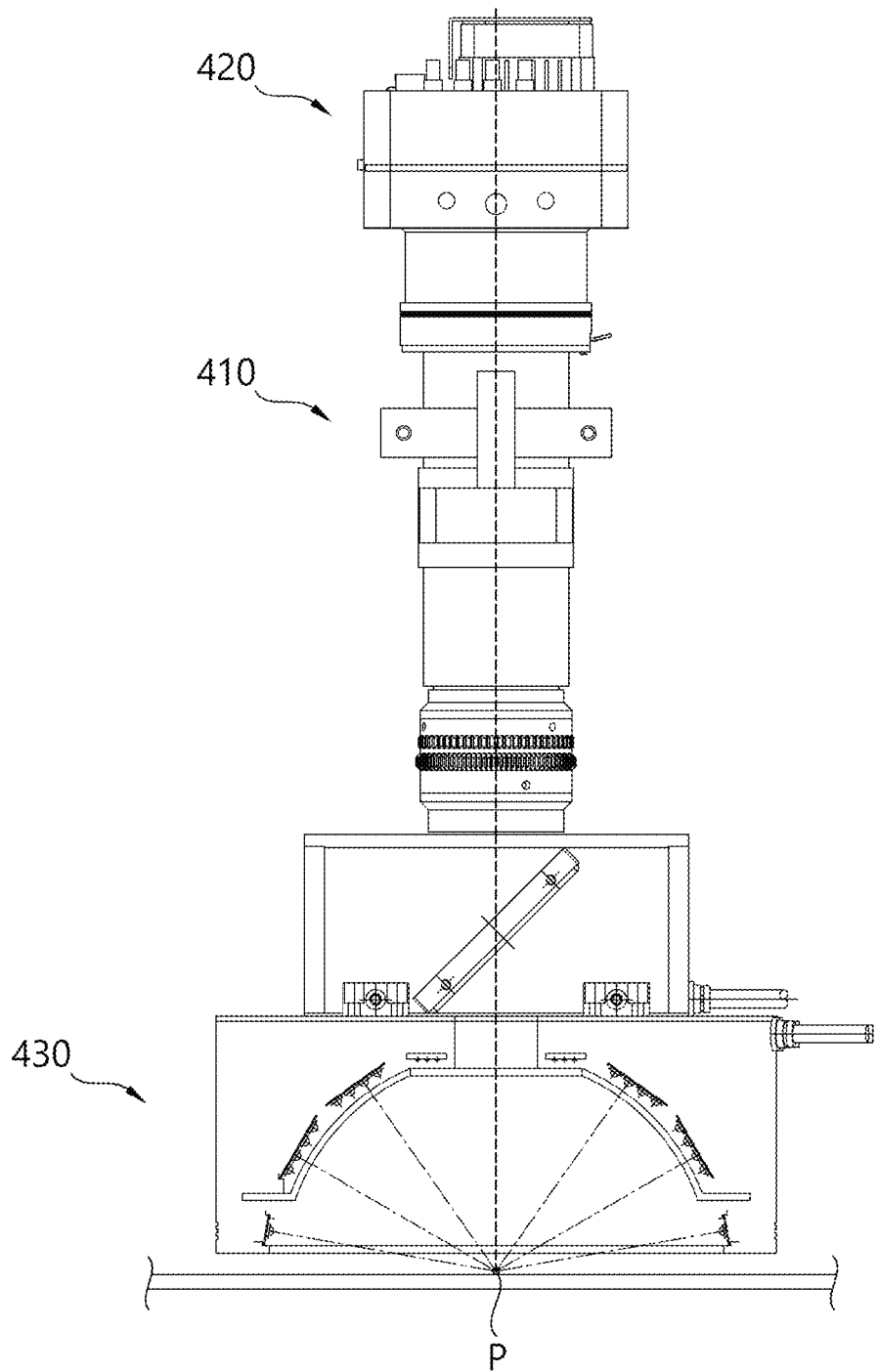
FIG. 18 is a cross-sectional view showing an optical axis of a second inspection module.

FIG. 18 is a cross-sectional view showing an optical axis of a second inspection module.

Referring to FIG. 18, the second inspection module 400 may include the second lighting unit 430 and the lower camera. The second inspection module 400 may obtain an image, in which a defect is more accurately shown, by illuminating the lower surface of the can with various combinations of light emitted from the second lighting unit 430. The cans are horizontally moved by the transport as they are lying in the lengthwise direction, and thus transported to the inspection position of the lower inspection module. The center on the lower surface of the can may be aligned with the optical axis of each lighting unit. The second lighting unit 430 emits light toward the inspection position P, and the second inspection module 400 directly obtains the image of the lower surface of the can for the secondary battery while the can is being illuminated with the light.

Figure 19:
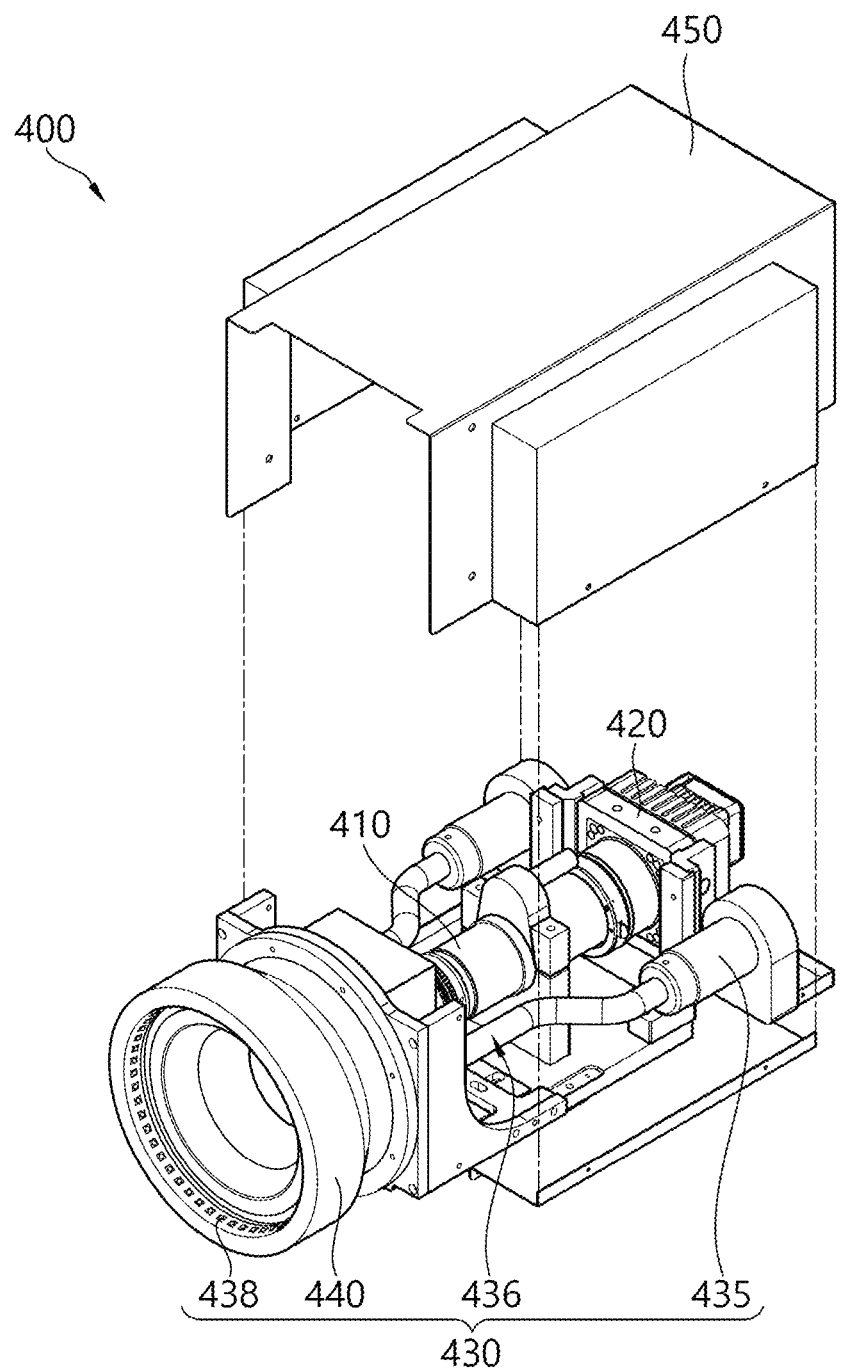
FIG. 19 is a partial exploded perspective view of a second inspection module.
Figure 20:
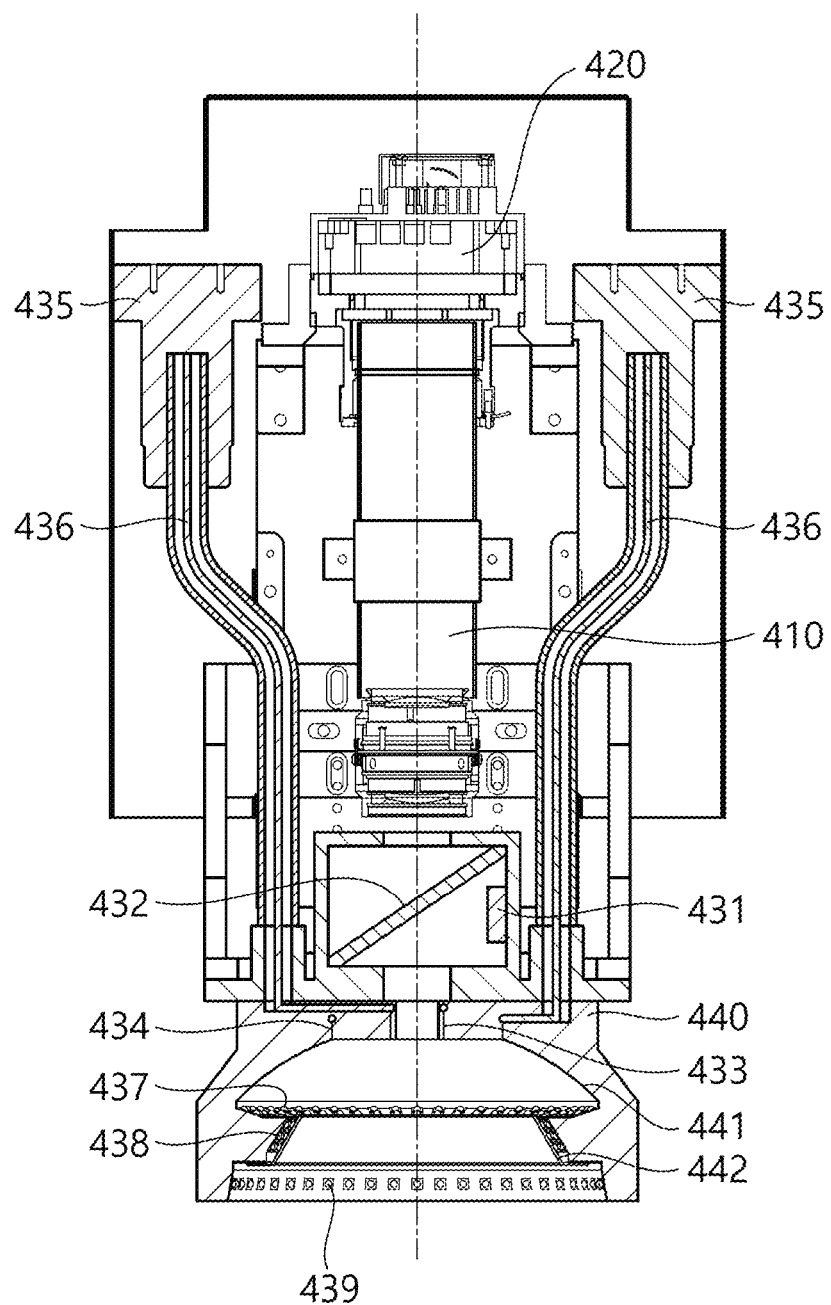
FIG. 20 is another cross-sectional view of a second inspection module.
Figure 21:
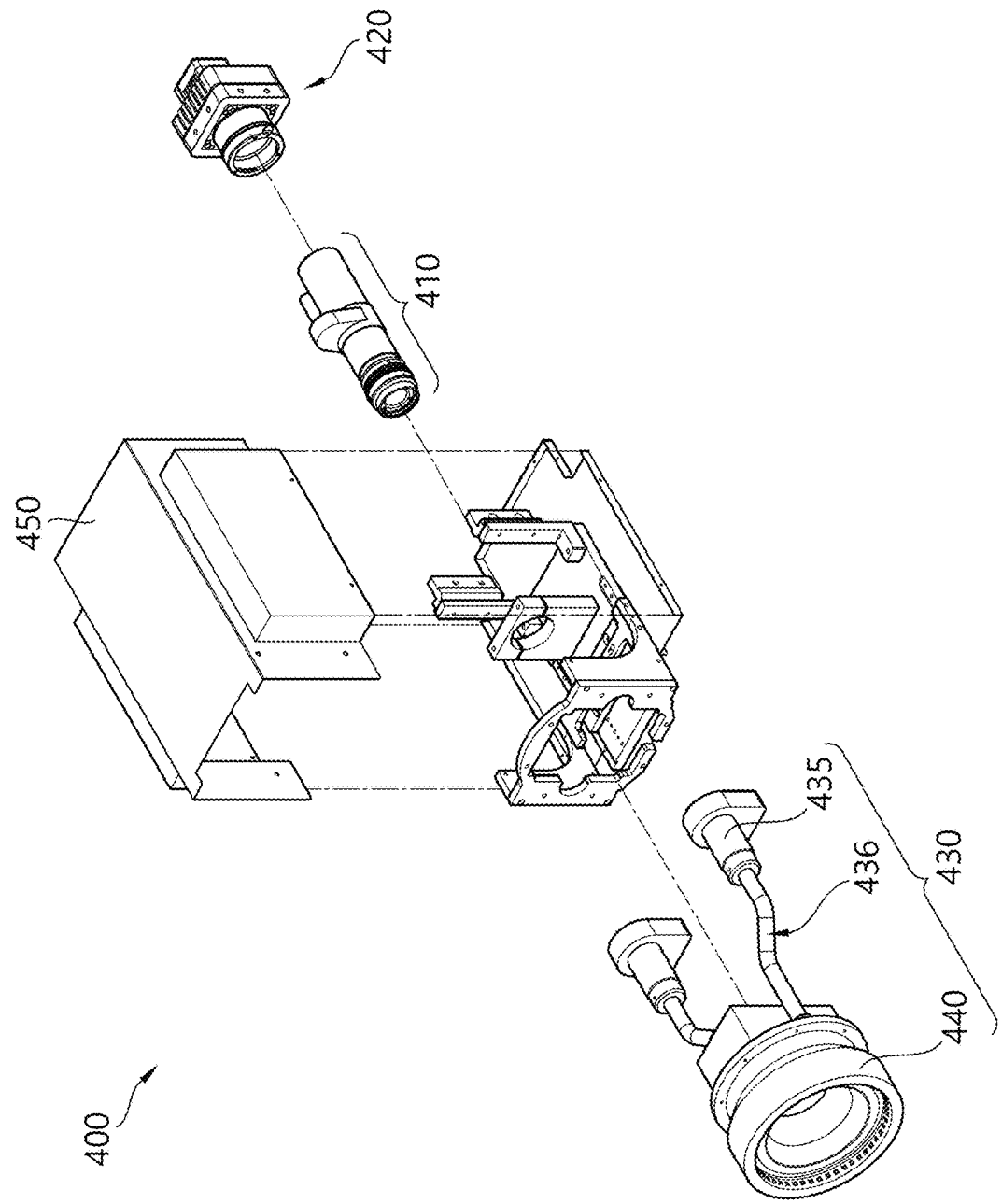
FIG. 21 is an exploded perspective view of a second inspection module.
Figure 22:
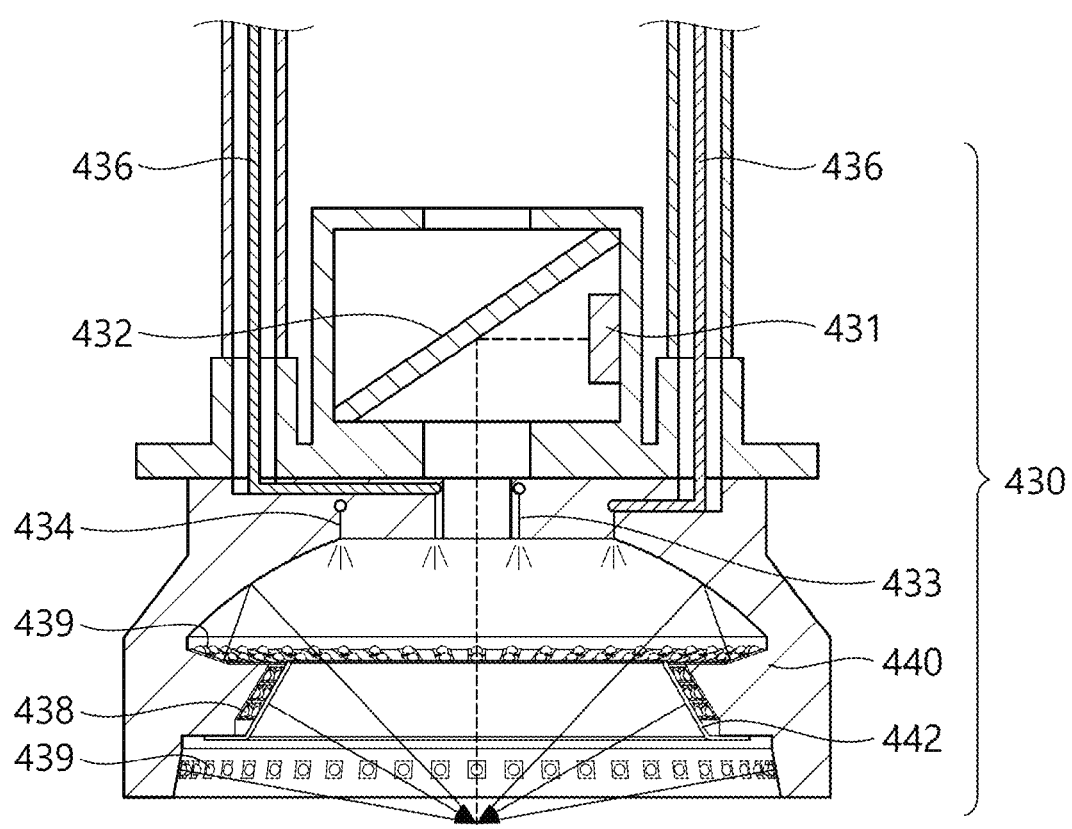
FIG. 22 is a cross-sectional view of a second lighting unit.

FIG. 19 is a partial exploded perspective view of a second inspection module, FIG. 20 is another cross-sectional view of a second inspection module, FIG. 21 is an exploded perspective view of a second inspection module, and FIG. 22 is a cross-sectional view of a second lighting unit.

Referring to FIGS. 19 to 22, the second inspection module 400 may be configured to obtain the image of the inspection position spaced apart at a predetermined distance on the optical axis.

The second inspection module 400 may include a lens module 410, a image sensor module 420, and the second lighting unit 430, and the casing 450 surrounding the lens module 410 and the image sensor module 420.

The lens module 410 is configured to change a focal length when obtaining an image of a subject, i.e., an object placed at the inspection position. The lens module 410 may include one or more lens kits. The lens is configured to change the focal length, and may for example include a polymer lens. In the case of including the polymer lens, the lens is varied in shape depending on an external force, thereby adjusting the focal length. In this case, a focal length adjuster (not shown) may be configured to change the shape of the polymer lens by transmitting a force to the polymer lens.

The image sensor module 420 may be configured to generate an electrical signal by capturing a subject. However, the image sensor module 420 may employ a widely used configuration, and thus more detailed descriptions thereof will be omitted.

The second lighting unit 430 may be configured to emit various types of light to an object. The object is made of various materials and has various shapes, and thus there may be a defect that is not detectable with a certain type of lighting due to its optical characteristics such as reflectivity and shadow. Therefore, the second lighting unit 430 emits various types of light, which are optically different in illumination angle, amount, etc. to check whether a defect is present in the outer appearance, thereby improving the accuracy in detecting the presence of the defect.

The second lighting unit 430 may include a plurality of light sources to emit various types of light. For example, the second lighting unit 430 may include a lighting frame 440, a coaxial lighting unit 431, a fiber lighting unit 433, a dome lighting unit 437, and inclined lighting units 438 and 439. The second lighting unit 430 may be configured to generally have rotational symmetry with respect to the optical axis. Further, the plurality of lighting units provided in the second lighting unit 430 is divided according to a plurality of areas along a rotational direction, and their operations are determined independently of each other. For example, the areas may be divided at intervals of 90 degrees along a rotational direction with respect to the optical axis. Alternatively, as necessary, the lighting units may be provided in two areas divided at intervals of 180 degrees and controlled to emit light.

The lighting frame 440 serves as a base in which various lighting units (to be described later) may be provided. The lighting frame 440 may be shaped like a cone, the radius of which becomes larger toward the inspection position, and has a first side adjacent to the lens module 410 and a second side adjacent to the inspection position. The lighting frame 440 may be formed with a hollow having a predetermined diameter in a center portion thereof to form the optical path. The lighting frame 440 may be shaped to have rotational symmetry with respect to the foregoing optical axis.

Meanwhile, the lighting frame 440 may be internally provided with at least two cutting surfaces on which the lighting units may be disposed at various angles. The at least two cutting surfaces are different in angle to the inspection position, so that the lighting units disposed on the cutting surfaces can emit light to the inspection position at different angles to each other. Meanwhile, the lighting frame 440 may be provided with a dome-type reflective surface 441 at one side thereof. The dome-type reflective surface 441 is configured to reflect light emitted from the dome lighting unit 437 (to be described later) to the inspection position.

The coaxial lighting unit 431 is configured to emit light along the same optical axis as an optical axis for obtaining the image by the second camera 420. The coaxial lighting unit 431 may be provided at one side of the foregoing lighting frame 440, and configured to emit light in a direction perpendicular to the foregoing optical axis.

A beam splitter 432 may be provided at a point where the optical path of the coaxial lighting unit 431 meets the optical axis of the lens module 410. The beam splitter 432 may be configured to pass light directed from the inspection position to the lens module 410 but reflect light emitted from the coaxial lighting unit 431 toward the inspection position.

The fiber lighting unit 433 may include a light source 435 at one side thereof to generate a larger amount of light than other lighting units, and a plurality of optical fibers penetrating the lighting frame 440 from the light source 435 and having one end exposed to the inside. The plurality of optical fibers 436 arranged along one circular path may be connected as a bundle to the light source 435.

The fiber lighting unit 433 may include a first fiber lighting unit 433 and a second fiber lighting unit 434 which are different in diameter of circular paths on which the ends thereof are disposed. Here, the first fiber lighting unit 433 and the second fiber lighting unit 434 refer to portions of the optical fiber bundles, which are exposed to the lighting frame 440 on the circular paths. The first fiber lighting unit 433 may be disposed along a circular path having a smaller diameter than that of the second fiber lighting unit 434.

The first fiber lighting unit 433 and the second fiber lighting unit 434 may be connected to the light sources 435 capable of generating a large amount of light, respectively. Referring to FIG. 20, for example, two light sources 435 are provided at left and right sides of the lens module 410, and transmit light to the first fiber lighting unit 433 and the second fiber lighting unit 434 through the plurality of optical fibers 436. Therefore, light may be selectively emitted along circular paths different in diameter from each other. However, the arrangement and number of optical fibers 436 are merely an example, and may be modified and applied in various numbers and combinations.

The dome lighting unit 437 is configured to emit light to the foregoing dome-type reflective surface 441, and may be disposed along a circular path. The light is emitted from the dome lighting unit 437 in a direction opposite to the inspection position, and reflected from the dome-type reflective surface 441 to the inspection position.

The inclined lighting units 438 and 439 are configured to emit light obliquely toward the inspection position. The inclined lighting units 438 and 439 may include a first inclined lighting unit 438 and a second inclined lighting unit 439 to emit light at different angles to the inspection position.

The first inclined lighting unit 438 may be configured to emit light at a greater angle to the inspection position than that of the second inclined lighting unit 439. The first inclined lighting unit 438 and the second inclined lighting unit 439 may be provided on the cutting surfaces having different inclinations on the lighting frame 440, respectively. The first inclined lighting unit 438 and the second inclined lighting unit 439 are configured to form circular paths along the cutting surfaces, and emit light while surrounding the inspection position. Meanwhile, a translucent plate 442 adjacent to the first inclined lighting unit 438 and made of a semi-transmissive material may be provided so that light emitted from the first inclined lighting unit 438 can be output as surface light.

The coaxial lighting unit 431, the dome lighting unit 437, the first inclined lighting unit 438 and the second inclined lighting unit 439 described above may include light emitting diodes (LED). Further, the dome lighting unit 437, the first inclined lighting unit 438, and the second inclined lighting unit 439 may include a plurality of LEDs and be provided on the lighting frame 440 along paths having rotational symmetry.

Meanwhile, the second lighting unit 430 may be controlled to emit light through one or more selected among the coaxial lighting unit 431, the fiber lighting unit 433, the dome lighting unit 437, and the inclined lighting unit, so that the image can be obtained. For example, the image may be obtained with light emitted by operating any one selected from among the lighting units or simultaneously operating a plurality of lighting units.

Figure 23:
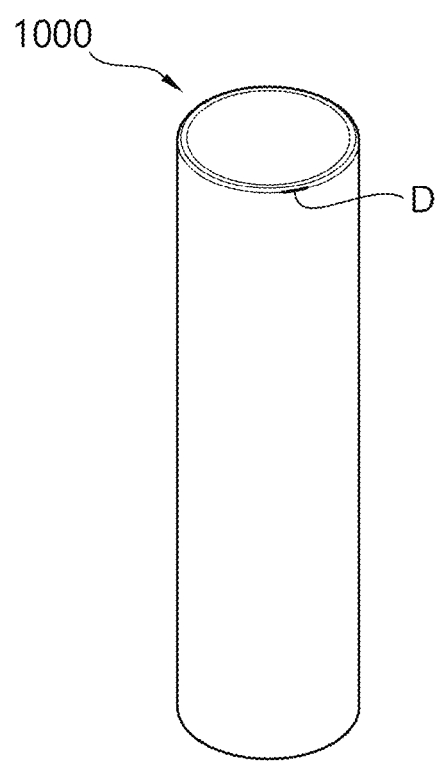
FIG. 23 is a view showing an example of a defect in a lower surface.

FIG. 23 is a view showing an example of a defect in a lower surface.

Referring to FIG. 23, a dent D of unknown cause may be present as a typical detect in the can 1000. In particular, the can is generally made of a metallic material, and therefore has a problem that a dent made due to hitting by an external object is hardly checkable with general lighting. In the case of a fine dent, such a defect is not detected by a general camera but capturable with light emitted at various angles. According to the disclosure, the second inspection module 400 improves the accuracy in detecting a defect with light emitted in various lighting combinations.

Below, the pinhole inspection module will be described with reference to FIGS. 24 to 25.

Figure 24:
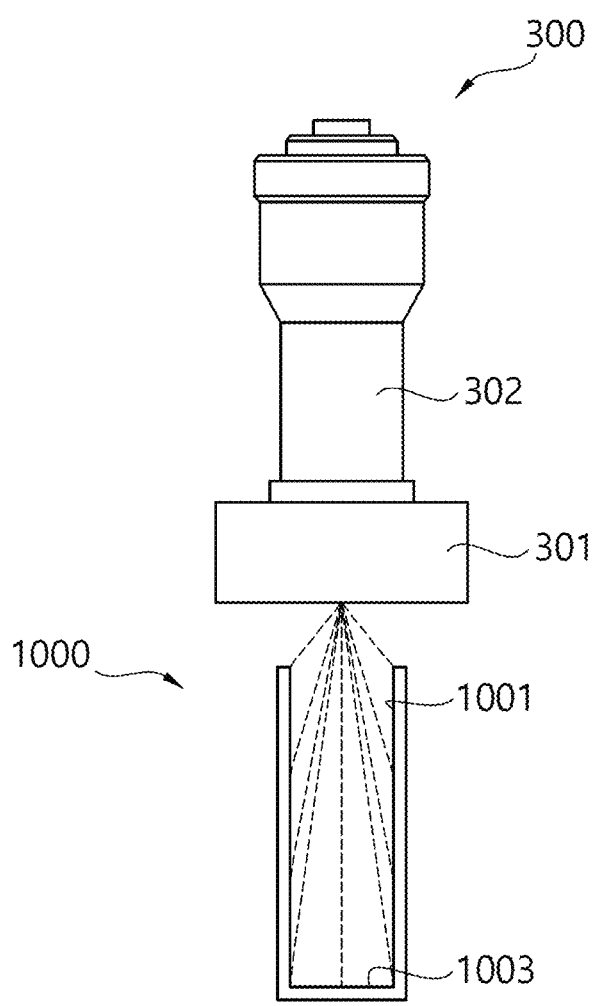
FIG. 24 is a conceptual view showing a wide view angle of a pinhole inspection module.

FIG. 24 is a conceptual view showing a wide view angle of the pinhole inspection module.

Referring to FIG. 24, the pinhole inspection module 300 has a small aperture unlike general cameras and thus has a very wide view angle. Therefore, the pinhole inspection module can take an image of the inside of the can 1000, i.e., both the inner surface of the lateral wall 1001 and the upper surface of the lower wall 1003.

The pinhole inspection module 300 may include a pinhole camera 302 and a pinhole lighting unit 301. However, the pinhole inspection module 300 may have a widely used configuration, and thus more detailed descriptions thereof will be omitted.

Figure 25:
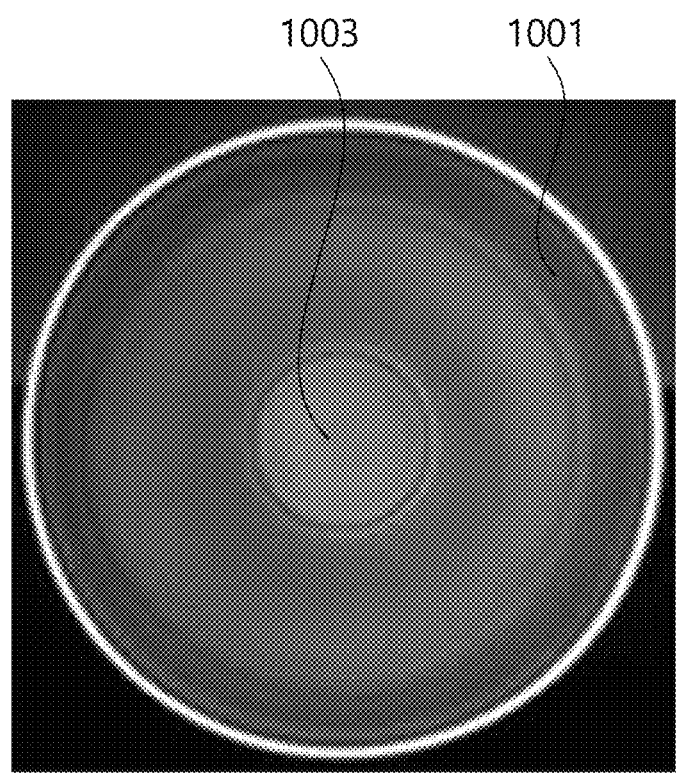
FIG. 25 is a view showing an image of the inside of a can captured by a pinhole inspection module.

FIG. 25 is a view showing an image of the inside of a can captured by the pinhole inspection module.

Referring to FIG. 25, the image obtained by the pinhole inspection module 300 is an image in which perspective is maximized by the structural characteristics of the pinhole inspection module 300. Therefore, an image showing both the inner surface of the lateral wall 1001 and the upper surface of the lower wall 1003 is obtained, and a defect is determined based on the obtained image.

Below, an apparatus for inspecting an appearance of a can for a secondary battery according to a second embodiment of the disclosure will be described.

The following embodiment may include the same configurations as those described in the foregoing embodiment, and thus only different configurations will be described to avoid repetitive descriptions.

Figure 26:
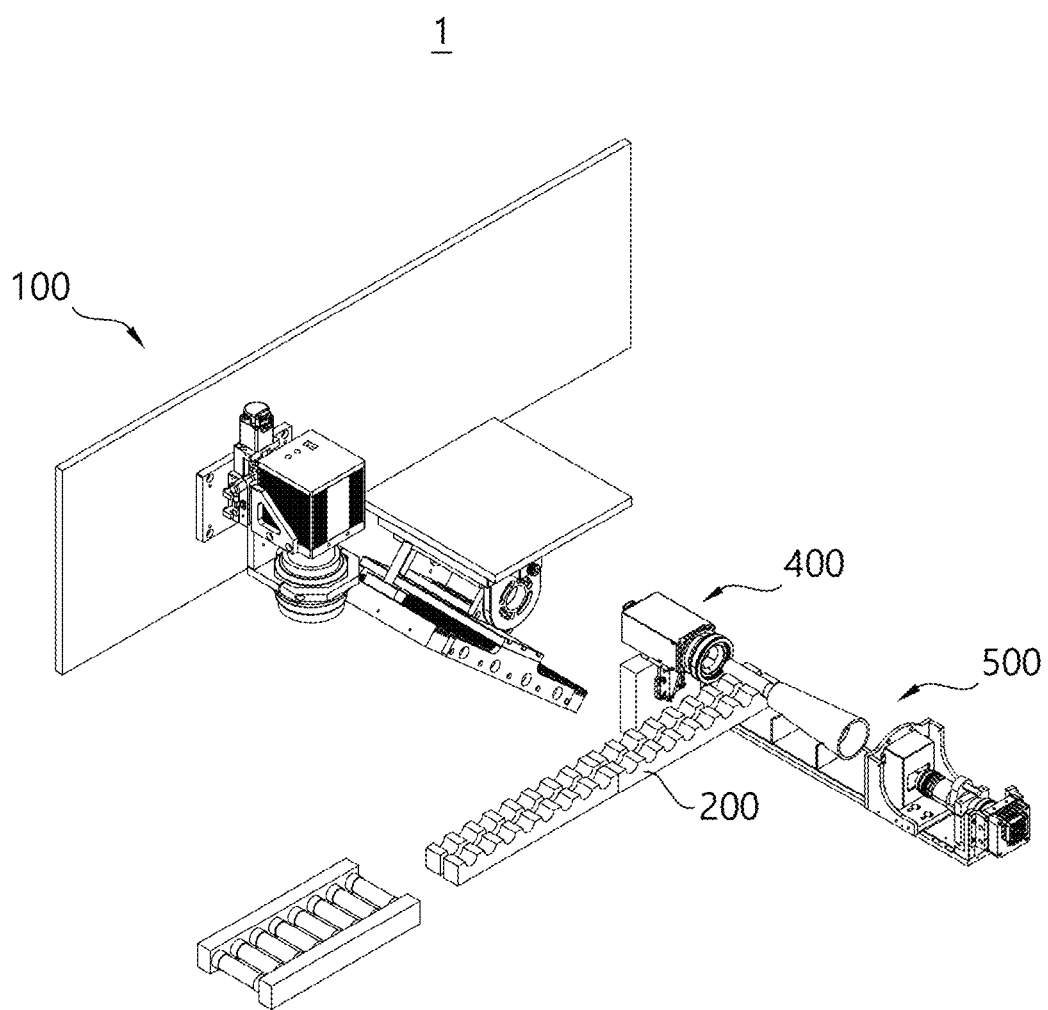
FIG. 26 is a perspective view of an apparatus for inspecting an appearance of a can for a secondary battery according to a second embodiment of the disclosure.

FIG. 26 is a perspective view of an apparatus for inspecting an appearance of a can for a secondary battery according to a second embodiment of the disclosure.

Referring to FIG. 26, the apparatus for inspecting an appearance of a can for a secondary battery according to the second embodiment of the disclosure includes the first inspection module, the second inspection module and the transport as described above, and the third inspection module may include not the pinhole inspection module but a general camera and a mirror.

Meanwhile, the first inspection module, the second inspection module and the transport may have the same or similar configurations to those of the first embodiment.

Figure 27:
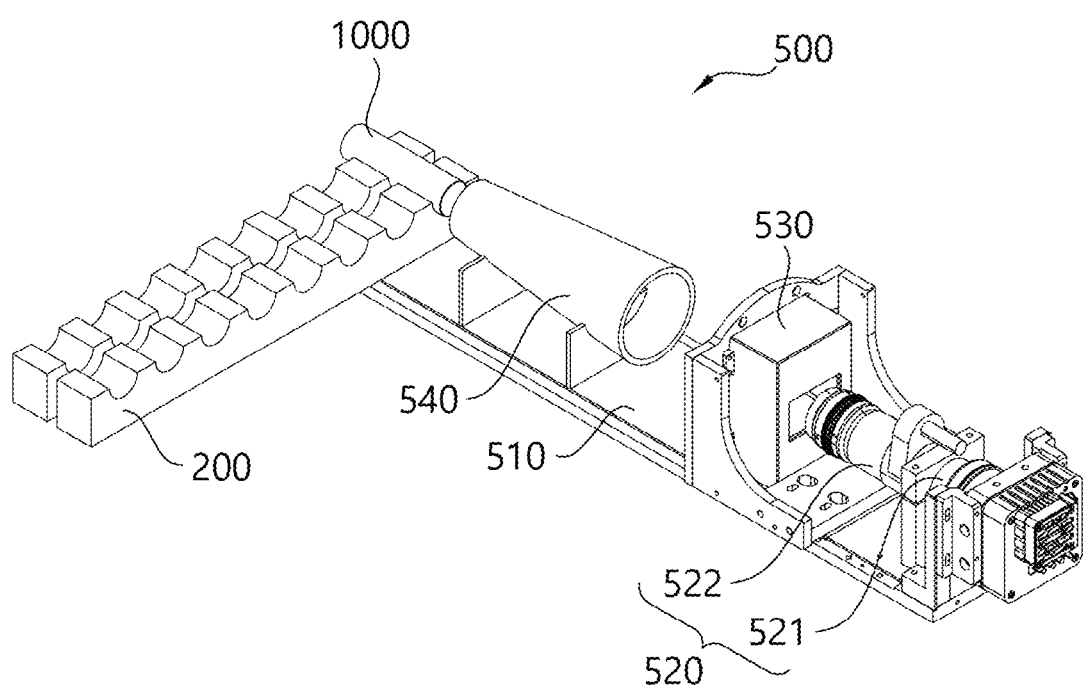
FIG. 27 is a perspective view of a third inspection module according to the second embodiment.
Figure 28:
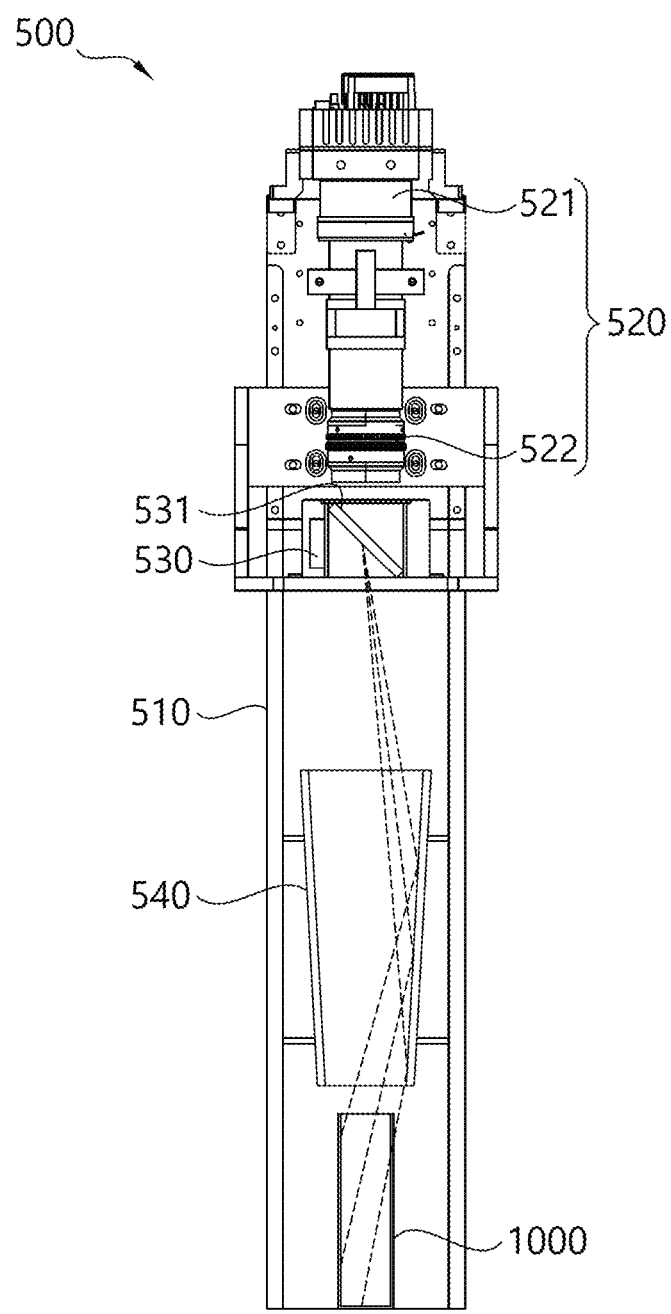
FIG. 28 is a cross-sectional view of the third inspection module according to the second embodiment.

FIG. 27 is a perspective view of a third inspection module according to the second embodiment, and FIG. 28 is a cross-sectional view of the third inspection module according to the second embodiment.

Referring to FIGS. 27 and 28, the third inspection module 500 according to the second embodiment of the disclosure may include a holding frame 510, a third camera 520, a third lighting unit 530, and a mirror 540.

The holding frame 510 is extended to have a predetermined length, and has one side connected to an external structure. The holding frame 510 may be configured to hold the third camera 520, the third lighting unit 530, and the mirror 540 (to be described later). However, the holding frame is not limited to the shape shown in FIGS. 24 and 25, but may have various shapes as long as it can hold the third camera, the third lighting unit, and the mirror.

The third camera 520 may be configured to obtain an image of the inside of the can. The third camera 520 may include an image sensor 521 and a lens kit 522. In this case, the lens kit 522 is configured to focus, and may for example include a polymer lens capable of fast focusing. When the lens kit 522 includes the polymer lens, it is possible to obtain not only an image directly captured based on the fast focusing when a capturing optical path is changed by the mirror 540 (to be described later) but also an image reflected by the mirror 540.

The third lighting unit 530 is configured to emit light to the inside of the can 1000 for the secondary battery. The third lighting unit 530 is configured to emit light to the inside of the can coaxially with the optical axis of the third camera 520. The third lighting unit 530 is configured to emit light in a vertical direction toward a beam splitter 531 at a position adjacent to the third camera 520, and emits light coaxially with the optical axis of the third camera 520 as the optical path is changed by the beam splitter 531. Such coaxial lighting solves a problem of structural difficulty in emitting light to the inside of the can 1000, thereby helping to detect a defect more clearly.

The mirror 540 is configured to reflect the image of the inner surfaces 1001 and 1003 of the can 1000 for the secondary battery. In other words, the mirror 540 makes it possible to obtain an image from angles such as an angle for viewing the inside of the can 1000 other than an angle for coaxially capturing the can 1000 for the secondary battery seated at the inspection position. The mirror 540 may be provided between the third camera 520 and the can 100 seated at the inspection position.

Figure 29:
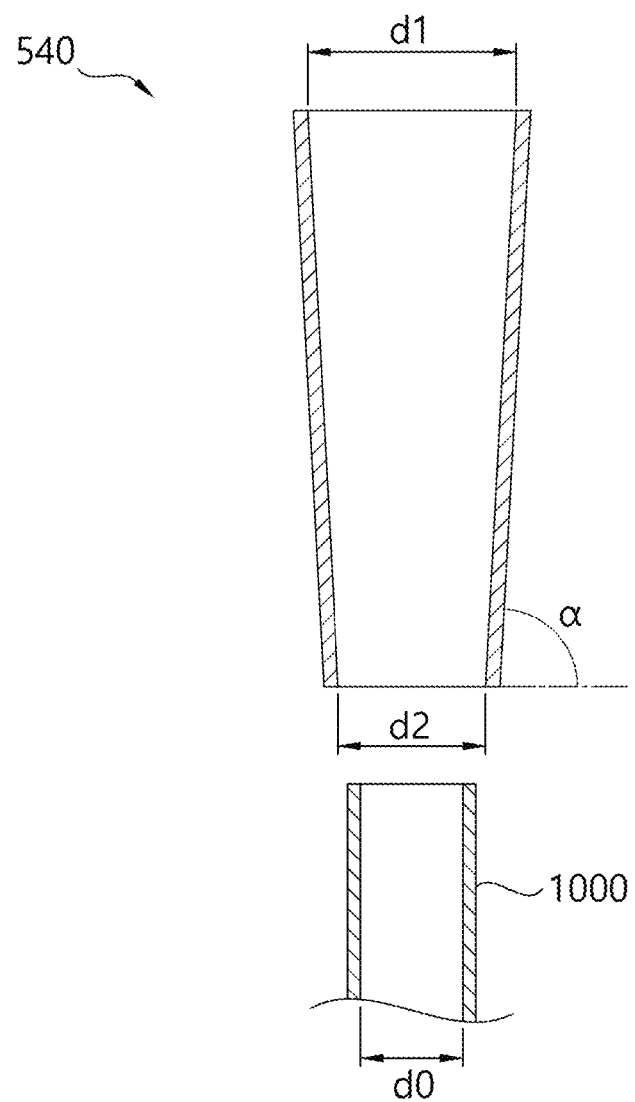
FIG. 29 is a cross-sectional view of a mirror and a can according to the second embodiment.

The mirror 540 may be formed having a predetermined inclination along the optical axis of the third camera 520 so that the third camera 520 can obtain a reflection image of the inside 1001 and 1003 of the can 1000 from above. Specifically, the mirror 540 may have a cylindrical shape of which opposite sides in the lengthwise direction are different in inner diameter, in other words, a conical shape of which a vertex portion is cut. The mirror 540 may obtain a reflection image along 360 degrees with respect to a central axis in the lengthwise direction. In other words, the mirror 540 allows an image of 360 degrees to be captured corresponding to the inner surfaces 1001 and 1003 of the can 1000 at once FIG. 29 is a cross-sectional view of a mirror and a can according to the second embodiment.

The mirror 540 may be configured to have different inner diameters at opposite sides thereof. For example, a first inner diameter d1 at the side adjacent to the third camera may be greater than a second inner diameter d2 at the side adjacent to the can. Therefore, the mirror 540 may be formed to have a trapezoidal shape with a long upper side when viewed from the lateral side. In this case, the mirror 540 may have an inclination α of an acute angle to the vertical direction at the side adjacent to the can. The mirror 540 with this configuration allows the image of the inside of the can 1000, reflected from the mirror 540, to be captured within the wide view angle of the third camera 520, so that an image can be taken as if the inside of the can 1000 is viewed at various angles. Meanwhile, the elements of the third inspection module may be positioned so that the third camera and the mirror can be spaced apart by a first distance, and the mirror and the can seated at an inside inspection position can be spaced apart by a second distance. In this case, the first distance may be greater than the second distance so that all the inner areas of the can be reflected from the mirror and captured as an image.

The can for the secondary battery is opened at only one side, and thus the inspection image may be obtained by performing the capturing at various angles to check a defect on the inside of the can. Therefore, a defect on the inside of the can is more accurately and rapidly determined based on the reflection image than that based on an image directly captured by the third camera 520 disposed coaxially with the lengthwise axis of the can 1000.

Figure 30:
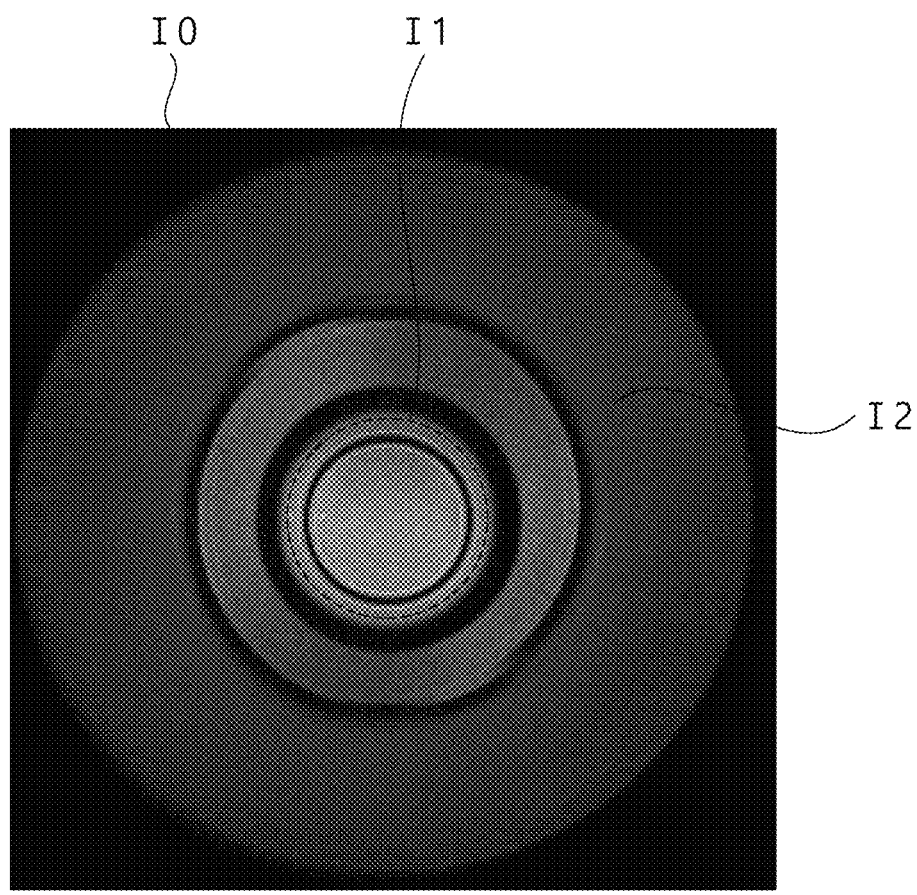
FIG. 30 is a view showing an image obtained by the third inspection module according to the second embodiment.
Figure 31:
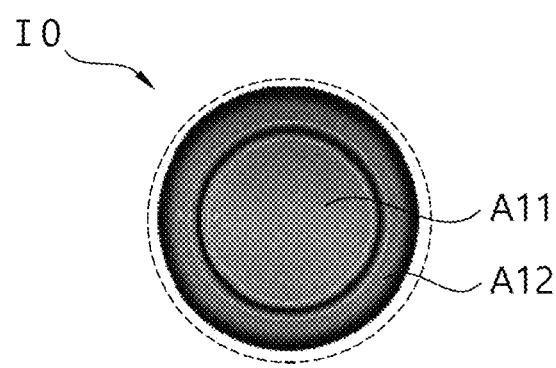
FIG. 31 is a view divisionally showing an area obtained by capturing the inside of a can directly by the third inspection module according to the second embodiment.
Figure 32:
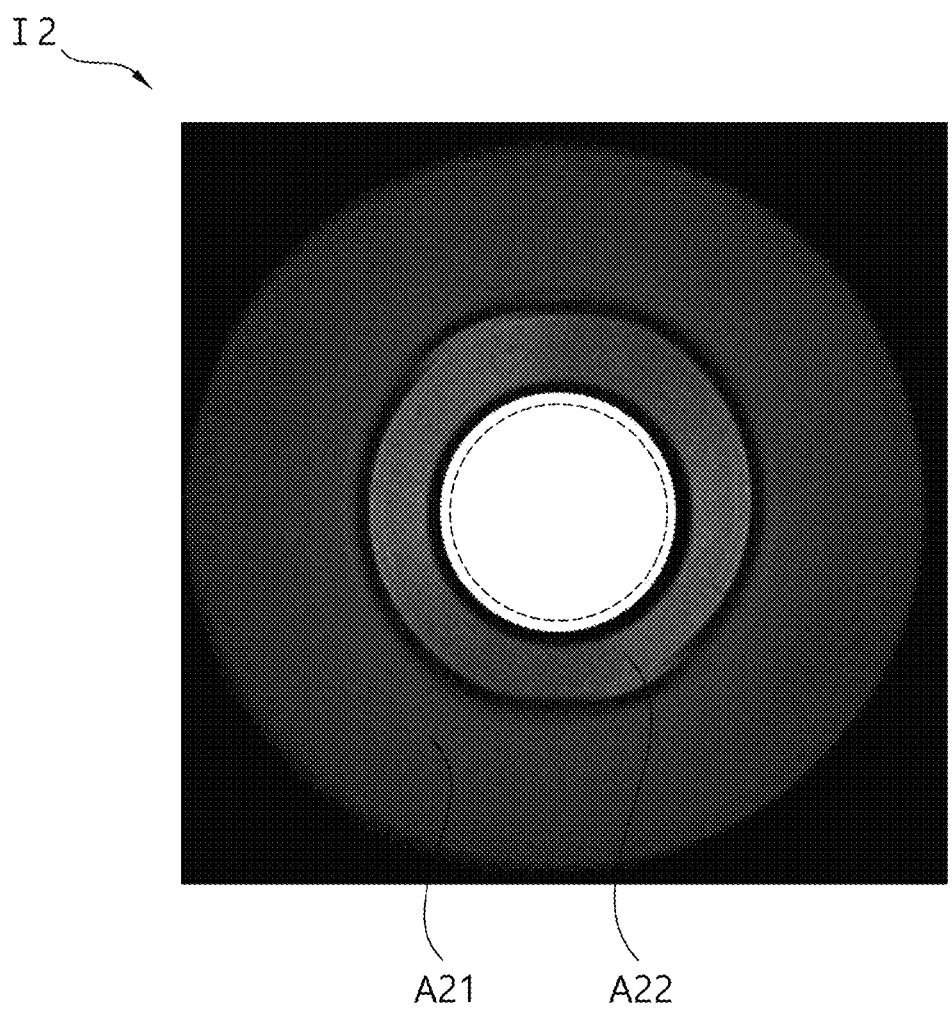
FIG. 32 is a view divisionally showing an area obtained by capturing the inside of a can reflected from a mirror of the third inspection module according to the second embodiment.

FIG. 30 is a view showing an image obtained by the third inspection module according to the second embodiment, FIG. 31 is a view divisionally showing an area obtained by capturing the inside of a can directly by the third inspection module according to the second embodiment, and FIG. 32 is a view divisionally showing an area obtained by capturing the inside of a can reflected from a mirror of the third inspection module according to the second embodiment.

Referring to FIGS. 30 to 32, an inspection image I0 obtained by the third camera 520 may include a partial image I1 obtained by directly capturing the inside of the can 1000 for the secondary battery and a partial image I2 based on reflection from the mirror. In this case, the image I1 obtained by directly capturing the inside of the can 1000 for the secondary battery is located in an inward portion of the inspection image I0, and may include an upper area A11 of the lower wall and an inner area A12 of the lateral wall. Further, the reflection image I2 may be shown outside the inward image I1, and the reflection image I2 may be an image of the inside of the can 1000 for the secondary battery, obtained when obliquely viewed 360 degrees along the circumferential direction of the can 1000. In this case, the reflection image I2 obtained by the mirror 540 reflecting the can 1000 for the secondary battery may be shown in the form of a ring. Likewise, the reflection image I2 may include the inner area A21 of the lateral wall and the upper area A22 of the lower wall. When the inspection image I0 is obtained, the image processor may determine a defect based on the obtained inspection image I0.

Figure 33:
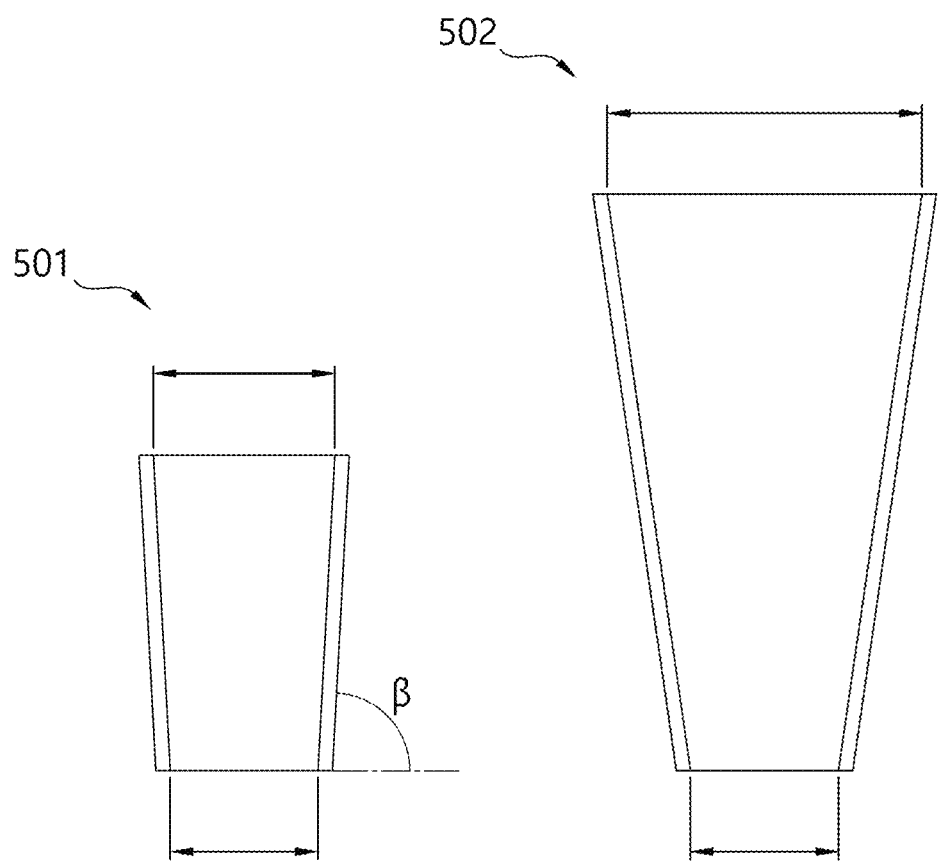
FIG. 33 is a view showing an alternative example of the mirror of the third inspection module according to the second embodiment.

FIG. 33 is a view showing an alternative example of the mirror of the third inspection module according to the second embodiment.

Referring to FIG. 33, the mirror 540 has an approximately conical lateral surface, but may be modified variously. Although the mirror 540 is modified, the third camera 520 may be configured to have an effect on changing an angle of viewing the inside of the secondary battery. For example, the modified lateral surface of the mirror 541 may have an adjustable inclination β, and a mirror 542 with an enlarged inner diameter at an upper side may be used. Further, the mirror 540 may be modified so that the length in the vertical direction can be changed and the upper and lower ends can be different in an inner diameter. In this case, the size of the mirror may increase as the length of the secondary battery increases.

Figure 34:
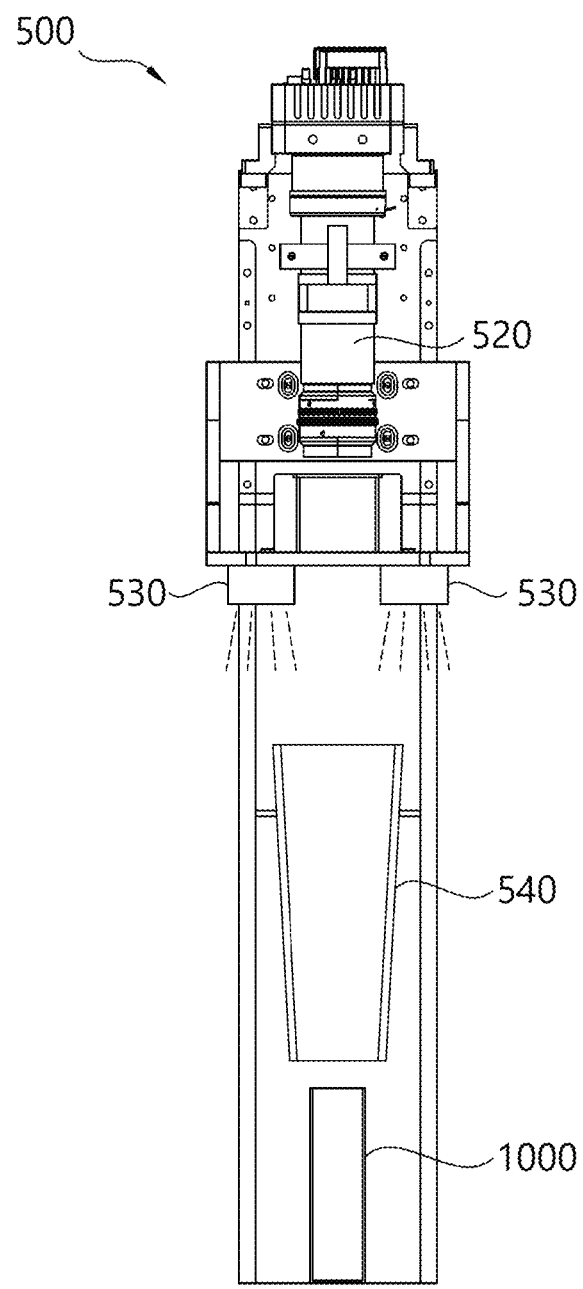
FIGS. 34 and 35 are cross-sectional views showing a third inspection module with a lighting module, modified from that of the second embodiment.
Figure 35:
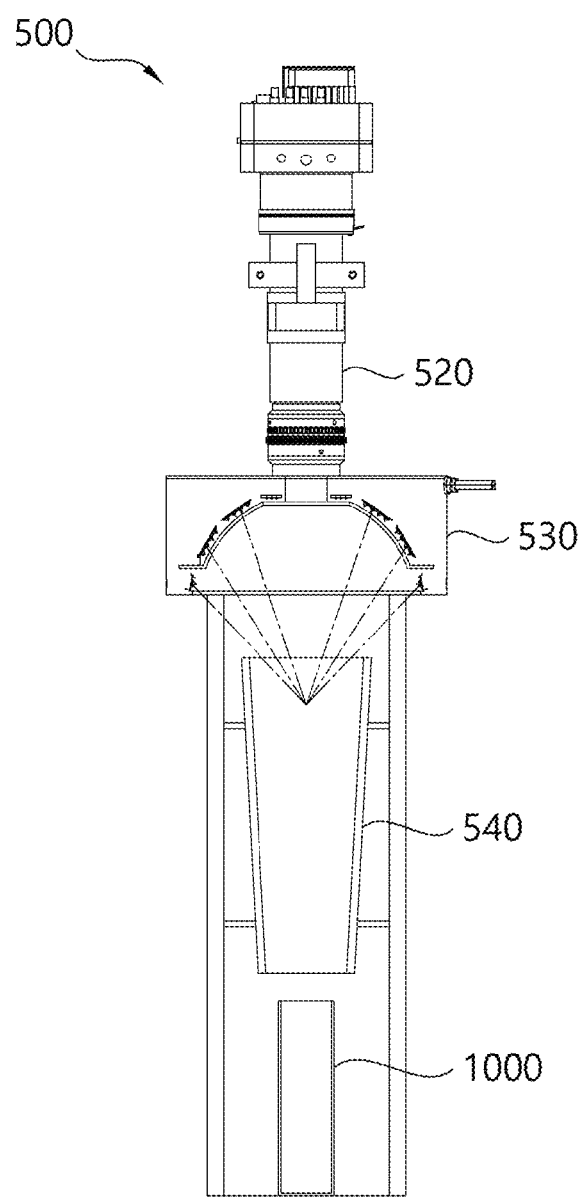

FIGS. 34 and 35 are cross-sectional views showing a third inspection module with a lighting unit, modified from that of the second embodiment.

Referring to FIG. 34, according to another embodiment of the disclosure, the third lighting unit 530 may have a ring shape disposed circumferentially with respect to the optical path. The ring-shaped lighting unit includes a plurality of light emitting modules configured to emit light toward the reflective surface of the mirror 540 and the inside of the can 1000 for the secondary battery.

Referring to FIG. 35, the third lighting unit 530 according to this embodiment may be modified to include a plurality of light emitting modules provided along the inner wall recessed upwards, i.e., a dome-type curved surface. The light emitting modules may be provided on the dome-type curved surface in order to emit light toward the mirror 540 at the lower side and the can 1000 for the secondary battery. When the third lighting unit 530 emits light toward the inside of the can at various angles, differences in shadow due to a physical defect are different from each other, thereby helping to check a defect.

In the foregoing embodiments, the third inspection module is configured to inspect the can 1000 for the secondary battery in a lying posture, but this is merely an example. Alternatively, the third inspection module may be modified and applied with an additional hand or the like to perform the inspection while the can 1000 is in a standing posture. In other words, the third inspection module may be modified to include the third camera, the third lighting unit and the mirror, which are arranged side by side in the vertical direction and the optical axis is disposed in the vertical direction. Further, the third inspection module may be modified and applied to have the optical axis at various angles.

As described above, an apparatus for inspecting an appearance of a can for a secondary battery according to the disclosure can obtaining each image of lateral, lower and inner surfaces to inspect the appearance for a defect, and perform the lateral inspection with respect to a plurality of cans at once, thereby having effects on shortening time taken in the inspection.

According to the disclosure, an apparatus for inspecting the appearance of a can for a secondary battery can obtain images of a plurality of cans according to angles and lighting combinations, thereby increasing an inspection rate for a defect and speeding up the inspection. Further, modules for inspecting the inside and outside of the can are individually provided, thereby having effects on rapidly inspecting the overall appearance of the can.

What is claimed is:

1. An apparatus for inspecting an appearance of a can for a secondary battery, the apparatus comprising:
    a transport configured to load a hollow can for a secondary battery in a widthwise direction and transport the can in the widthwise direction;
    a first inspection module configured to obtain a lateral image of the can while rotating a plurality of cans, which are loaded side by side in the transport, with respect to a lengthwise axis;
    a second inspection module adjacent to the transport, and configured to obtain an image of a lower surface of the can loaded in the transport;
    a third inspection module adjacent to the transport, and configured to obtain an image of an inside of the can loaded in the transport; and
    an image processor configured to determine a detect of the can based on the images received from the first inspection module, the second inspection module and the third inspection module,
    wherein the first inspection module comprises:
        a hand configured to adjust an angle of the plurality of cans loaded in the transport with respect to the lengthwise axis at once;
        a first lighting unit configured to simultaneously emit light to lateral surfaces of the plurality of cans adjusted in angle by the hand; and
        a first camera configured to simultaneously obtain captured images of the plurality of cans illuminated with the light, and
    wherein the image processor is configured to:
        divide the captured images of the lateral surfaces of the plurality of cans obtained by the first camera into entity image areas as areas in which the cans are individually captured; and
        generate an inspection image by combining the entity image areas according to the captured images for one can.

2. The apparatus of claim 1, wherein
    the first lighting unit comprises a plurality of light emitting units provided at a position obliquely facing in the lengthwise direction of the can picked up by the hand, and
    the image processor is configured to generate at least two inspection images based on the images obtained by emitting light from different light emitting units among the plurality of light emitting units to each can.

3. The apparatus of claim 2, further comprises a controller,
    wherein each light emitting unit is extended in a direction perpendicular to the lengthwise direction, and
    wherein the controller controls the light emitting units of the first lighting unit are disposed at different positions along the lengthwise direction of the can, to operate in sequence.

4. The apparatus of claim 3, wherein the controller controls the operating light emitting units of the first lighting unit to be switched.

5. The apparatus of claim 4, wherein the first lighting unit is disposed to emit light obliquely to a direction in which the cans loaded in the transport are arranged.

6. The apparatus of claim 5, wherein the first camera has an optical axis disposed perpendicularly to a direction in which a predetermined number of picked-up secondary batteries are arranged.

7. The apparatus of claim 6, wherein
    the second inspection module comprises:
        a second camera configured to obtain an image for a lower inspection position to capture a lower surface of the can loaded in the transport;
        a lens module provided on an optical path between the lower inspection position and the image sensor module, and configured to adjust a focal length; and
        a second lighting unit configured to emit light to the lower inspection position,
    the second lighting unit comprises:
        a coaxial lighting unit configured to emit light to the lower inspection position coaxially with the optical path;
        a fiber lighting unit comprising a plurality of optical fibers provided along a circumferential path of a predetermined radius with respect to a central axis of the optical path of the second camera;
        a dome lighting unit configured to emit light to a reflective surface provided at one side so that reflection light can be emitted to the lower inspection position; and
        an inclined lighting unit configured to emit light having an inclination at the lower inspection position.

8. The apparatus of claim 7, wherein the third inspection module comprises a pinhole camera.

9. The apparatus of claim 1, wherein
    the third inspection module comprises:
        a third camera disposed to form an optical axis in a direction of viewing an inside of the can disposed at an inside inspection position for inspecting the inside of the can;
        a third lighting unit configured to emit light toward the inside of the can; and
        a mirror provided between the third camera and the can disposed at the inside inspection position, and
    the third camera is configured to obtain an inside inspection image for an image comprising the inside of the can reflected from the mirror.

10. The apparatus of claim 9, wherein
    the inside inspection image comprises images of an upper surface of a lower wall and an inner surface of a lateral wall of the can, and the upper surface and the inner surface reflected from the mirror.

11. The apparatus of claim 10, wherein the mirror comprises a reflective surface which is at least partially curved.

12. The apparatus of claim 11, wherein the mirror has a cylindrical shape, of which a first inner diameter at a first end adjacent to the third camera is greater than a second inner diameter at a second side adjacent to the can seated at the inspection position.

13. The apparatus of claim 12, wherein the second inner diameter is greater than an outer diameter of the can.

14. The apparatus of claim 13, wherein the third camera is configured to simultaneously obtain images of 360 degrees in a circumferential direction with respect to the inner surface of the can.

15. The apparatus of claim 14, wherein the third camera and the mirror are spaced apart by a first distance, and the mirror and the can seated at the inside inspection position are spaced apart by a second distance, and the first distance is greater than the second distance.

16. The apparatus of claim 15, wherein
the third inspection module comprises a beam splitter, the third lighting unit emits light toward the beam splitter in a direction perpendicular to the optical axis of the third camera, and
the light emitted from the third lighting unit is converted to have the same optical axis as the optical axis of the third camera by the beam splitter.

17. The apparatus of claim 15, wherein the third lighting unit is provided at an end portion of the third camera, and comprises at least one light emitting module along a recessed surface.

18. The apparatus of claim 15, wherein the third lighting unit comprises light emitting modules along an annular path with respect to the optical axis of the third camera.

19. The apparatus of claim 9, wherein the second inspection module and the third inspection module face each other at opposite sides in the lengthwise direction of the can with the can positioned therebetween.

\* \* \* \* \*